US011190438B2

(12) United States Patent
Rahman et al.

(10) Patent No.: US 11,190,438 B2
(45) Date of Patent: Nov. 30, 2021

(54) TWINNING SERVICE FOR GROUPS OF INTERNET OF THINGS (IOT) DEVICES

(71) Applicant: CONVIDA WIRELESS, LLC, Wilmington, DE (US)

(72) Inventors: Shamim Akbar Rahman, Cote St. Luc (CA); Dale N. Seed, Allentown, PA (US); Michael F. Starsinic, Newtown, PA (US); Quang Ly, North Wales, PA (US); William Robert Flynn, IV, Schwenksville, PA (US); Vinod Kumar Choyi, Conshohocken, PA (US); Zhuo Chen, Claymont, DE (US); Yogendra C. Shah, Exton, PA (US)

(73) Assignee: Convida Wireless, LLC, Wilmington, DE (US)

( * ) Notice: Subject to any disclaimer, the term of this patent is extended or adjusted under 35 U.S.C. 154(b) by 102 days.

(21) Appl. No.: 16/096,529

(22) PCT Filed: Apr. 25, 2017

(86) PCT No.: PCT/US2017/029328
§ 371 (c)(1),
(2) Date: Oct. 25, 2018

(87) PCT Pub. No.: WO2017/189523
PCT Pub. Date: Nov. 2, 2017

(65) Prior Publication Data
US 2019/0132236 A1     May 2, 2019

Related U.S. Application Data

(60) Provisional application No. 62/326,941, filed on Apr. 25, 2016.

(51) Int. Cl.
*H04W 4/50* (2018.01)
*H04L 12/761* (2013.01)
(Continued)

(52) U.S. Cl.
CPC .......... *H04L 45/16* (2013.01); *H04L 41/0893* (2013.01); *H04L 41/12* (2013.01);
(Continued)

(58) Field of Classification Search
CPC .............. H04B 7/18541; H04B 17/382; H04L 67/1095; H04L 67/16; H04W 4/50;
(Continued)

(56) References Cited

U.S. PATENT DOCUMENTS

| 2007/0189482 A1* | 8/2007 | Erb | H04M 3/58 |
| --- | --- | --- | --- |
| | | | 379/158 |
| 2013/0121231 A1* | 5/2013 | Kim | H04L 12/189 |
| | | | 370/312 |

(Continued)

FOREIGN PATENT DOCUMENTS

JP     2006-094330 A     4/2006

OTHER PUBLICATIONS

"RESTful Network API for Twinning Devices", Open Mobile Alliance (OMA), Candidate Version 1.0, Dec. 15, 2015, pp. 1-120 (Year: 2015).*

(Continued)

*Primary Examiner* — Salvador E Rivas
(74) *Attorney, Agent, or Firm* — BakerHostetler

(57) ABSTRACT

IoT twinning groups can be dynamically created. These twinning groups can be activated based on selected triggers. As part of twinning operation, service delivery can be re-directing away from the primary device to the IoT twinning group. Messages originating from members of the IoT twinning group can be processed and forwarded externally as if they came from the primary device. Further, the twinning service can be de-activated based on selected triggers.

18 Claims, 31 Drawing Sheets

(51) Int. Cl.

| | |
|---|---|
| *H04L 29/12* | (2006.01) |
| *H04L 12/24* | (2006.01) |
| *H04W 52/28* | (2009.01) |
| *H04W 88/18* | (2009.01) |
| *H04W 48/18* | (2009.01) |
| *H04L 12/741* | (2013.01) |
| *H04L 29/08* | (2006.01) |
| *H04W 4/70* | (2018.01) |

(52) U.S. Cl.
CPC .......... *H04L 45/74* (2013.01); *H04L 61/1547* (2013.01); *H04L 67/12* (2013.01); *H04W 4/50* (2018.02); *H04W 48/18* (2013.01); *H04W 52/28* (2013.01); *H04W 88/18* (2013.01); *H04L 67/00* (2013.01); *H04W 4/70* (2018.02); *Y04S 40/00* (2013.01)

(58) Field of Classification Search
CPC ... H04W 40/005; H04W 48/18; H04W 52/28; H04W 88/18
See application file for complete search history.

(56) References Cited

U.S. PATENT DOCUMENTS

| | | | |
|---|---|---|---|
| 2014/0155064 A1* | 6/2014 | Pandey ................. | H04W 36/22 455/436 |
| 2016/0057268 A1 | 2/2016 | Jiang | |
| 2016/0135023 A1* | 5/2016 | Schmit ................. | H04M 3/543 455/417 |
| 2020/0288291 A1* | 9/2020 | Wang .................... | H04W 8/183 |

OTHER PUBLICATIONS

Wikipiedia "Indoor Positioning System", https://en.wikipedia.org/wiki/Indoor_positioning_system, Retrieved May 28, 2019, 12 pages.

Shelby et al., "The Constrained Application Protocol (CoAP)" Internet Engineering Task Force (IETF) RFC: 7252, Jun. 2014, 112 pages.

Shelby et al., "CoRE Resource Directory draft-ietf-core-resource-directory-02" CoRE Internet-Draft Standards Track, Nov. 9, 2014, 37 pages.

Shelby et al., "Constrained RESTful Environments (CoRE) Link Format" Internet Engineering Task Force (IETF) RFC: 6690, Standards Track, Aug. 2012, 22 pages.

Rahman et al., "Group Communication for the Constrained Application Protocol (CoAP)" Internet Engineering Task Force (IETF) RFC: 7390, Oct. 2014, 47 pages.

OneM2M-TS-0001 V1.6.1 Technical Specification "Functional Architecture" Jan. 30, 2015, 321 pages.

InterDigital, "IoT Devices Additional Twinning Requirements", OMA-ARC-TWOM-2014-0008, Open Mobile Alliance (OMA), Oct. 27, 2014, 5 pages.

Droms et al., "Dynamic Host Configuration Protocol" Network Working Group RFC: 2131, Mar. 1997, 45 pages.

Cotton et al., "IANA Guidelines for IPv4 Multicast Address Assignments" Internet Engineering Task Force (IETF) RFC: 5771, Mar. 2010, 11 pages.

Anonymous: "Multicast—Wikipedia", Dec. 14, 2015, pp. 1-4.

Anonymous, "RESTful Network API for Twinning Devices—Candidate Version 1.0—Dec. 15, 2015" Jan. 18, 2016 120 pages.

* cited by examiner

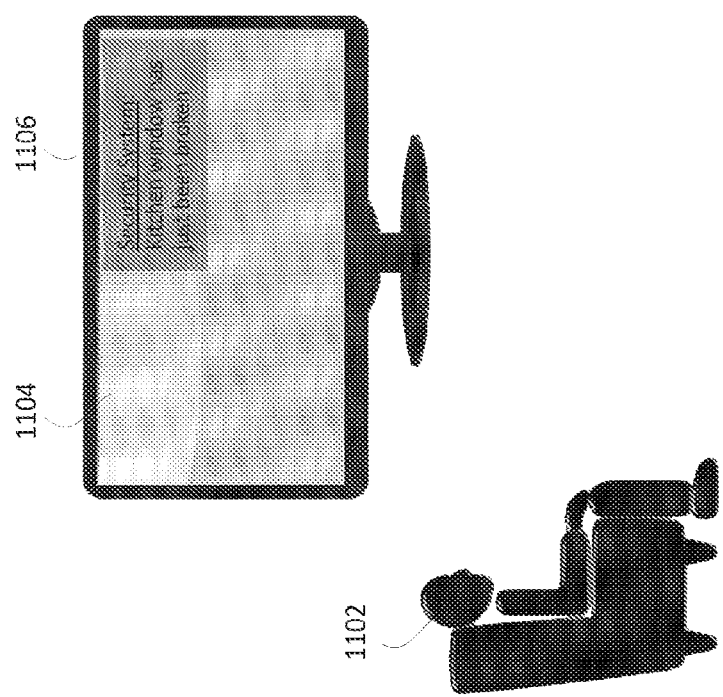

TWINNING SERVICE FOR GROUPS OF INTERNET OF THINGS (IOT) DEVICES

CROSS-REFERENCE TO RELATED APPLICATIONS

This Application is a National Stage Application filed under 35 U.S.C. § 371 of International Application No. PCT/US2017/029328 filed Apr. 25, 2017, which claims the benefit of U.S. Provisional Patent Application Ser. No. 62/326,941 entitled "Twinning Service For Groups of Internet of Things (IOT) Devices", filed Apr. 25, 2016, the disclosures of which are hereby incorporated by reference as if set forth in their entireties.

BACKGROUND

A Machine-to-Machine (M2M)/Internet of Things (IoT) Service Layer (SL) is a technology targeted towards providing value-added services for M2M/IoT devices and applications. oneM2M is an exemplary global standard body which is developing M2M/IoT SLs to address challenges associated with the integration of M2M/IoT devices and applications into deployments with the Internet/Web, cellular, enterprise, and home networks.

An M2M/IoT SL can provide applications and devices access to a collection of M2M/IoT oriented capabilities. Examples include security, charging, data management, device management, discovery, provisioning, and connectivity management. These capabilities are made available to applications via Application Programming Interfaces (APIs) which make use of message formats, resource structures and resource representations supported by the M2M/IoT SL.

From a protocol stack perspective, service layers are typically layered on top of existing network protocol stacks and provide value added services to client applications as well as other services. Hence, service layers are often categorized as 'middleware' service layers.

FIG. 1 shows a service layer 102 located in-between an Internet Protocol (IP) networking stack 104 and applications 106. Alternately, a service layer 102 can be directly layered over a transport protocol such as Transmission Control Protocol (TCP) or User Datagram Protocol (UDP) or over a non-RESTful protocol such as SOAP (not shown in FIG. 1).

An example deployment scenario of service layer instances within a network is shown in FIG. 2. In this example, the service layer instances are deployed on various network nodes (gateways and servers) and are providing value-added services to network applications, device applications, and to the network nodes themselves.

The oneM2M standard (oneM2M-TS-0001 oneM2M Functional Architecture-V-1.0.0) defines a Service Layer called "Common Service Entity (CSE)" as illustrated in FIG. 3. The purpose of the Service Layer is to provide "horizontal" services that can be utilized by different "vertical" M2M systems and applications, such as e-Health, fleet management, and smart homes.

The CSE 302 supports four reference points. The Mca reference point interfaces with the Application Entity (AE) 304. The Mcc reference point interfaces with another CSE 306 within the same service provider domain and the Mcc' reference point interfaces with another CSE in a different service provider domain 308. The Mcn reference point interfaces with the underlying network service entity (NSE) 310. An NSE 310 provides underlying network services to the CSEs, such as device management, location services and device triggering. CSE 302 contains multiple logical functions called "Common Service Functions (CSFs)", such as "Discovery", and "Data Management & Repository".

FIG. 4 illustrates CSFs defined in the oneM2M standards. A wide range of CSFs are defined ranging from basic CSFs such as Discovery 402 and Registration 404 to more complex CSFs such as Charging 406 and Data Management 408.

Device Management (DM) is the process by which a user at a centrally located site can configure, monitor, diagnose, and otherwise manage a remotely located device. This is especially valuable when the devices are mobile in nature or deployed in remote areas that make access to them difficult. Typically, a DM server 502 at a central site pushes commands to be executed on the device 504. A DM client running on the device 504 can receive these commands and process the state changes necessary to execute the desired operations. This communication mechanism between the DM server 502 and the DM client is implemented using defined procedures and message formats and is known as a DM protocol. Two well-known Open Mobile Alliance (OMA) DM protocols are the DM Protocol (http://openmobilealliance.org/about-oma/work-program/device-management/) and the LWM2M Protocol.

FIG. 5 shows the OMA DM Protocol architecture in which a DM Server 502 sends device management commands to DM Clients running on devices 504. The DM Client maintains a set of Managed Objects (MO) 506 within a resource structure referred to as the DM Tree 508. These MOs 506 are used to manage a particular function on the device such as software updates. The management commands operate on the nodes of the DM Tree 508 and may cause state changes within the device. These management commands are sent over the DM Interface 510 using the DM Protocol. The Device Specific Interface 514 is outside the scope of the DM Protocol and is platform specific.

The OMA LWM2M Protocol provides a client-server architecture in which a LWM2M Server 602 manages a LWM2M Client 604 running on a device 608. FIG. 6 shows the LWM2M architecture and the different interfaces it provides. In addition, LWM2M Objects 606 are resources that reside on the device 608 and DM operations are performed on the objects 606.

The OMA LWM2M protocol incorporates the Constrained Application Protocol (CoAP) family of standards. The CoAP family of standards can include "The Constrained Application Protocol (CoAP)—RFC 7252", "Group Communication for the Constrained Application Protocol (CoAP)—RFC 7390", "CoRE Resource Directory", and "CoRE Link Format—RFC 6690" as part of its specification.

CoAP is an application level Web transfer protocol optimized for IoT scenarios. CoAP is expected to take a prominent role in future IoT communications, similar to the prominent role of HTTP today in the current Web. CoAP reuses key concepts from the current Internet Web such as Universal Resource Indicators (URIs), and a client/server based Representational State Transfer (REST) communication model. Also, since CoAP is optimized for IoT scenarios, it supports some features not available in the current Web. For example, CoAP has very low overhead as it uses UDP for transport, and binary message header encoding. CoAP also supports multicast distribution of messages from one client to multiple servers. Group Communication for the Constrained Application Protocol (CoAP)—RFC 7390

The interaction model of CoAP is similar to the client/server model of Hypertext Transfer Protocol (HTTP). CoAP 702 can be considered logically as using a two-layer approach as shown in FIG. 7. In particular, a CoAP messages layer 704 deals with UDP 706 (with different reliability requirements) while the request/response layer 708 deals with the asynchronous nature of the interactions, by using Methods (GET, PUT, POST, DELETE) and Request/Response codes. CoAP 702 is however a single protocol in the sense that the logical messages layer and the request/response layer are just features of the CoAP header.

CoAP also introduces a centralized server, called a Resource Directory (RD), which stores information about available URIs (resources) on other devices in the network. This allows for quick discovery of required URIs by any IoT device via a single lookup interface on the RD CoRE Resource Directory. The information about the requested URI is returned by the RD in a specific format called a Link Format. (CoRE Link Format—RFC 6690)

SUMMARY

This disclosure describes twinning operation for IP based services in IoT scenarios with a single primary device, and a group of related twinned secondary devices. It is assumed that the devices do not have Subscriber Identity Modules (SIMs). Specifically, the disclosure describes new Service Layer logic for:
  Dynamically creating IoT twinning groups (including auto assignment of devices to the appropriate twinning group)
  Activating the twinning service based on selected triggers (i.e. internal logic of SL server, or from external node input)
  Then as part of twinning operation:
    Re-directing service delivery away from the primary device to the IoT twinning group
    Processing messages originating from members of the IoT twinning group, and forwarding them externally as if they came from the primary device
  De-activating the twinning service based on selected triggers (internal to the SL server, or from external node input)

An OMA LWM2M embodiment and a separate oneM2M embodiment of the IoT group twinning service is described. Also, a new user interface is defined to graphically display the primary and secondary members of a given IoT twinning group. Finally, proposed changes to the OMA, IETF and oneM2M standards to support this feature are described.

This Summary is provided to introduce a selection of concepts in a simplified form that are further described below in the Detailed Description. This Summary is not intended to identify key features or essential features of the claims subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

A more detailed understanding may be had from the following description, given by way of example in conjunction with the accompanying drawings wherein:

FIG. 11A illustrates an embodiment where a home owner is watching TV when an alarm service is triggered.

DETAILED DESCRIPTION

Twinning in the broadest sense refers generically to establishing a service presence for some other identity. Once twinning is established, services can be extended from the primary device 802 to the twinned (secondary) device 804 per the capabilities of the device and services. For example, such service can include voice, video, messaging, and IP data. Also messages originated from the twinned (secondary) devices 804 can appear as if they came from the primary device 802.

Figure 1:
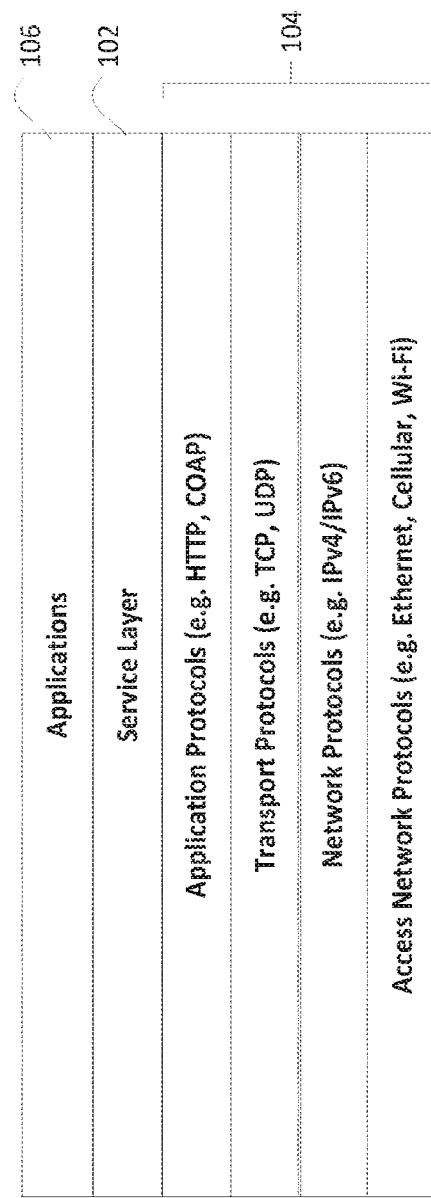
FIG. 1 illustrates a protocol stack supporting a service layer.
Figure 2:
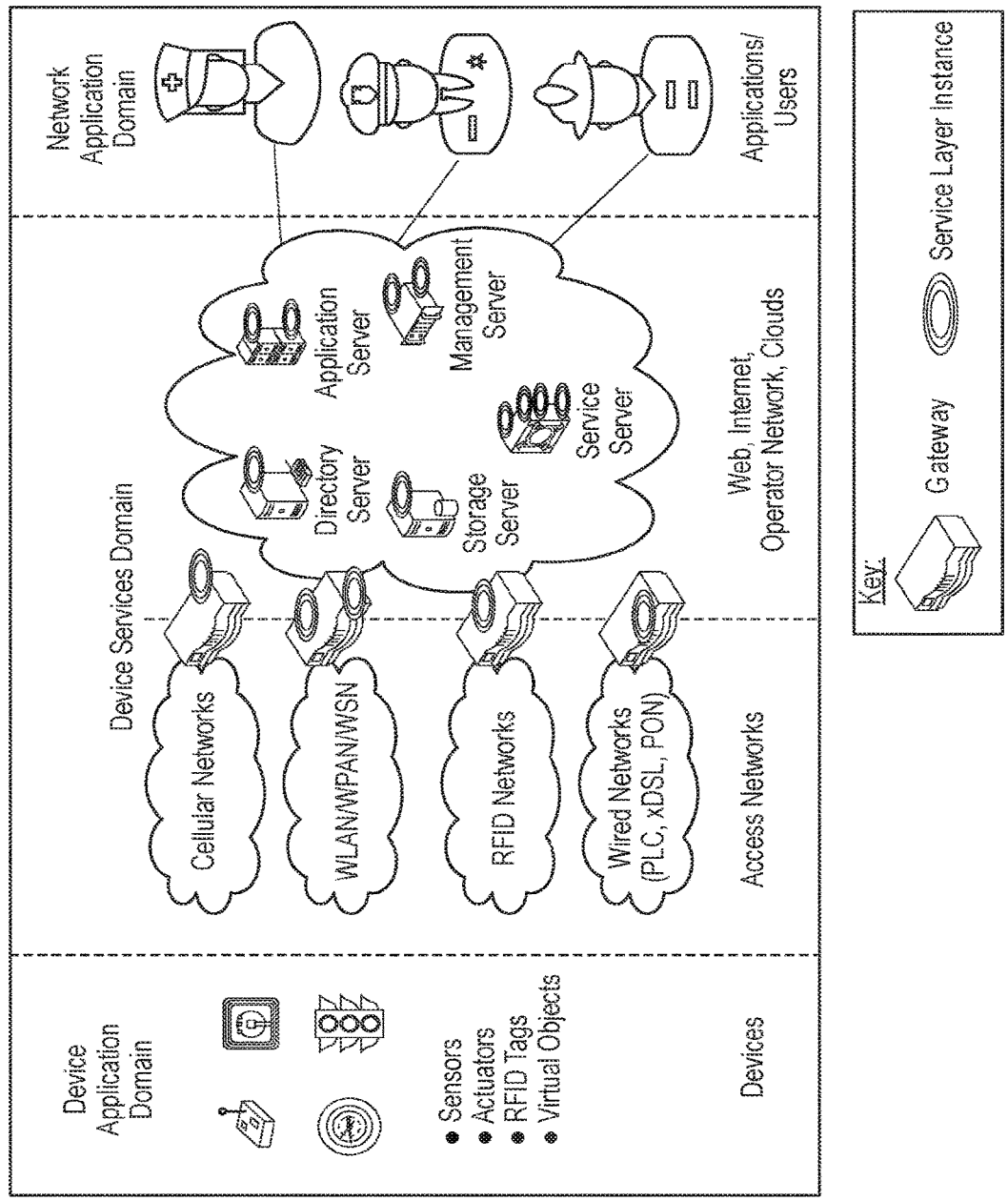
FIG. 2 illustrates an exemplary service layer deployment within a network.
Figure 3:
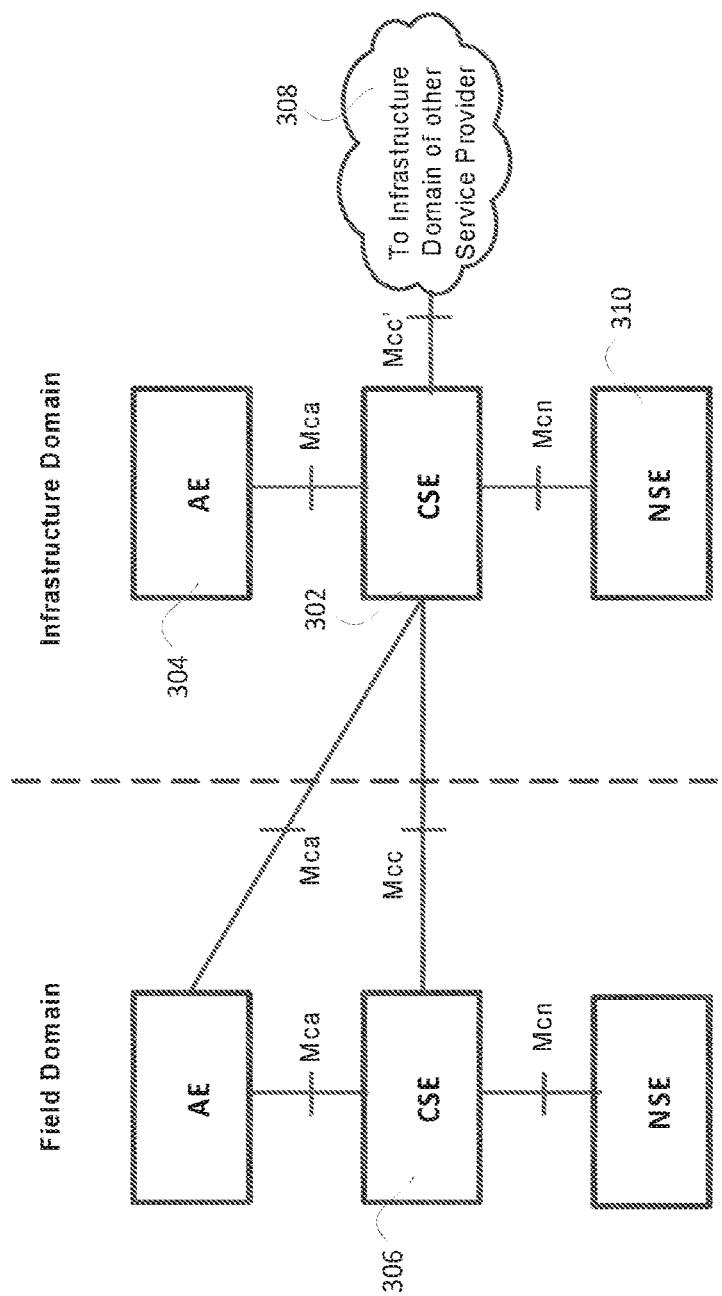
FIG. 3 illustrates a oneM2M Architecture.
Figure 4:
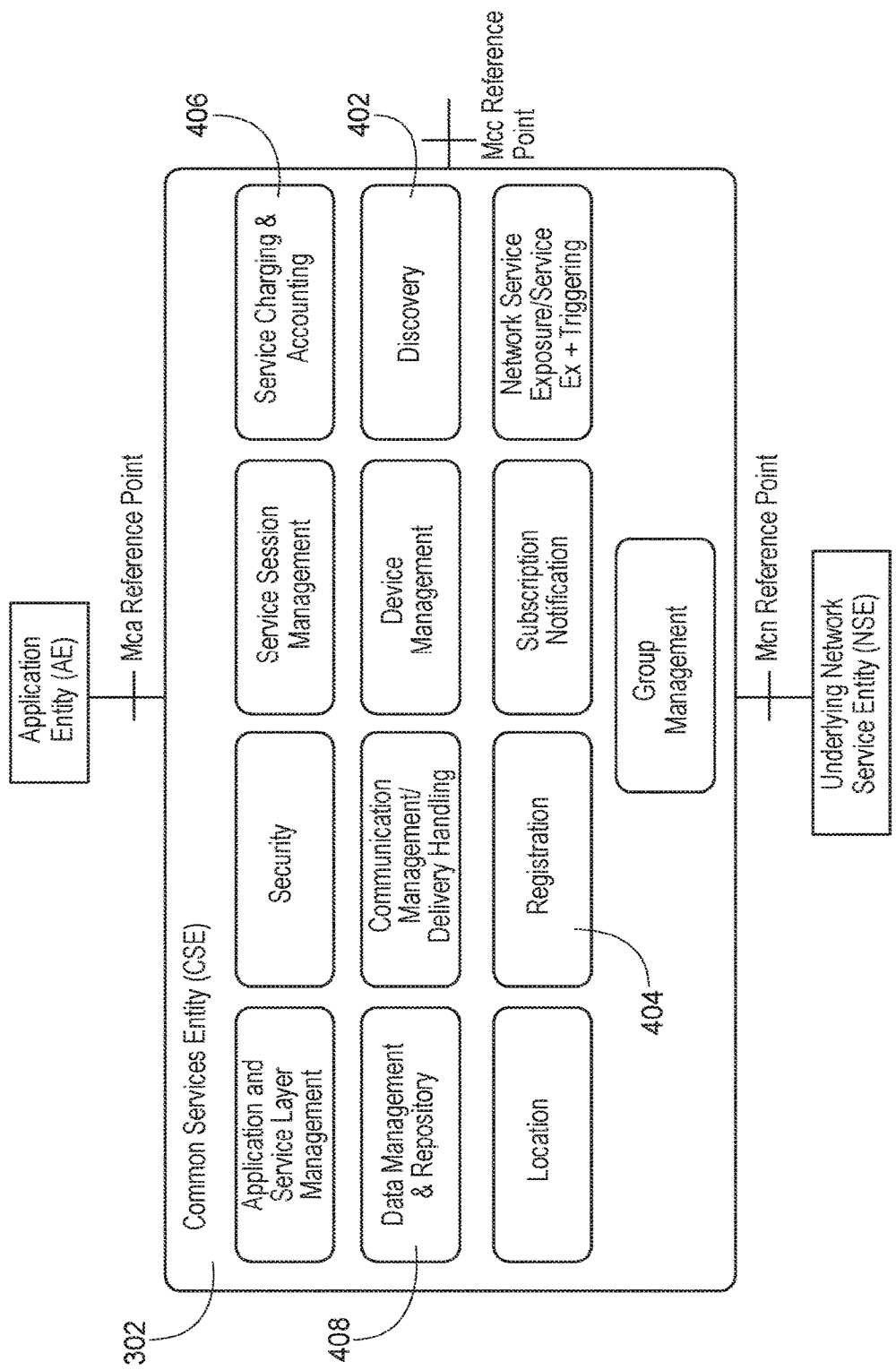
FIG. 4 illustrates a oneM2M Common Service Functions (CSFs).
Figure 5:
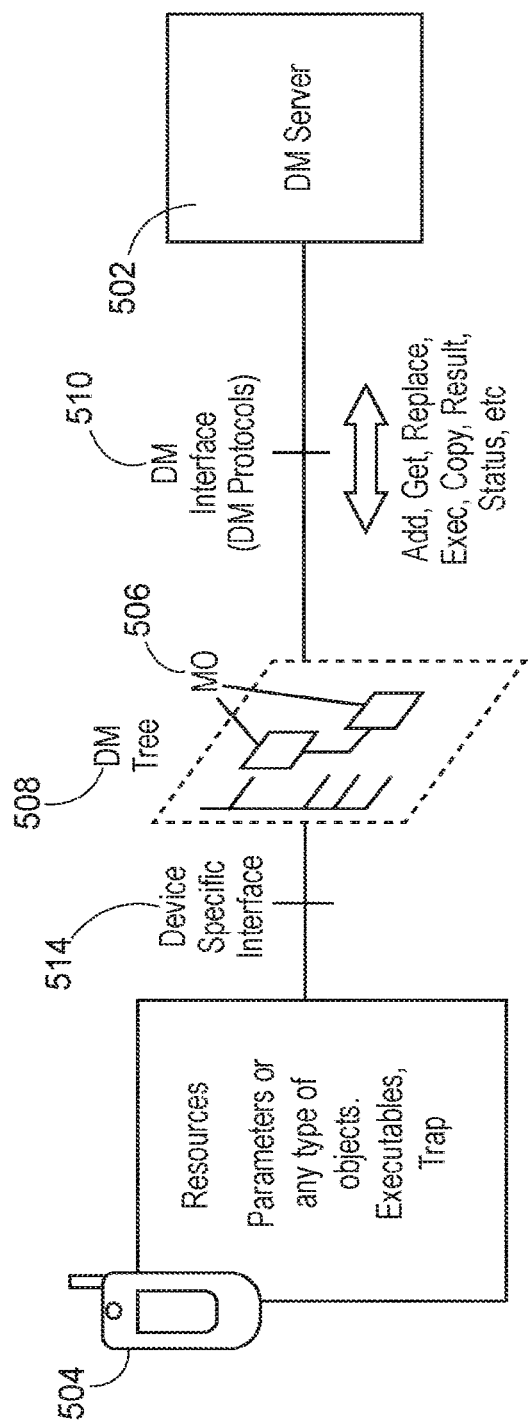
FIG. 5 illustrates a OMA DM protocol architecture.
Figure 6:
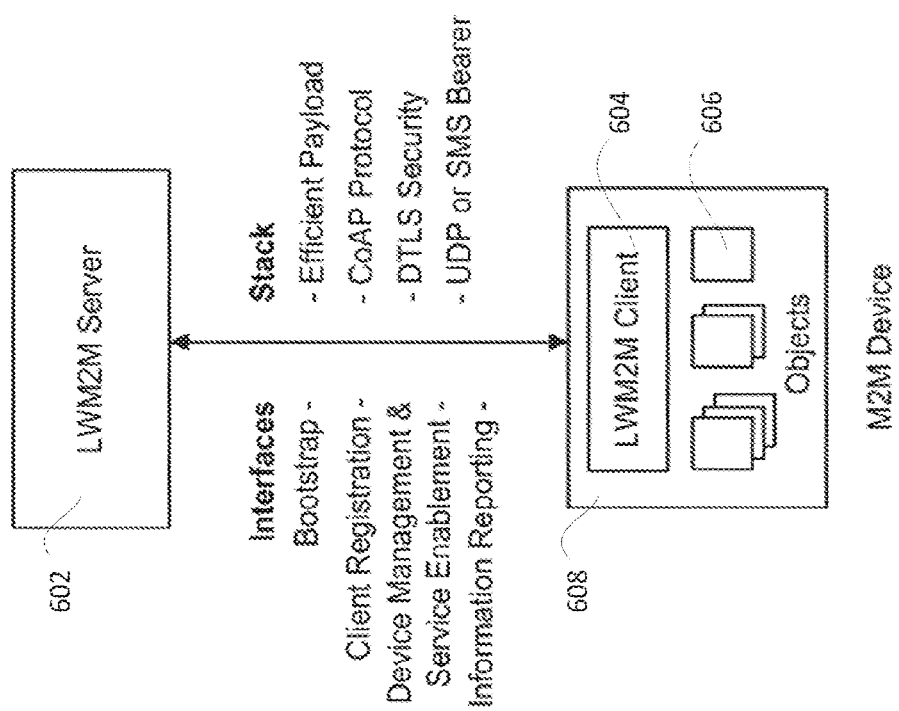
FIG. 6 illustrates OMA LWM2M protocol architecture.
Figure 7:
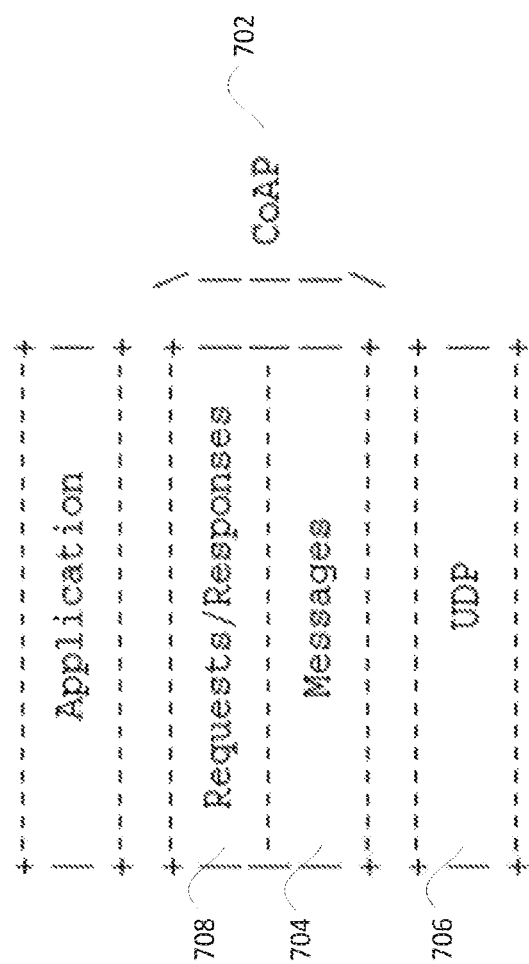
FIG. 7 illustrates abstract layers for CoAP.
Figure 8:
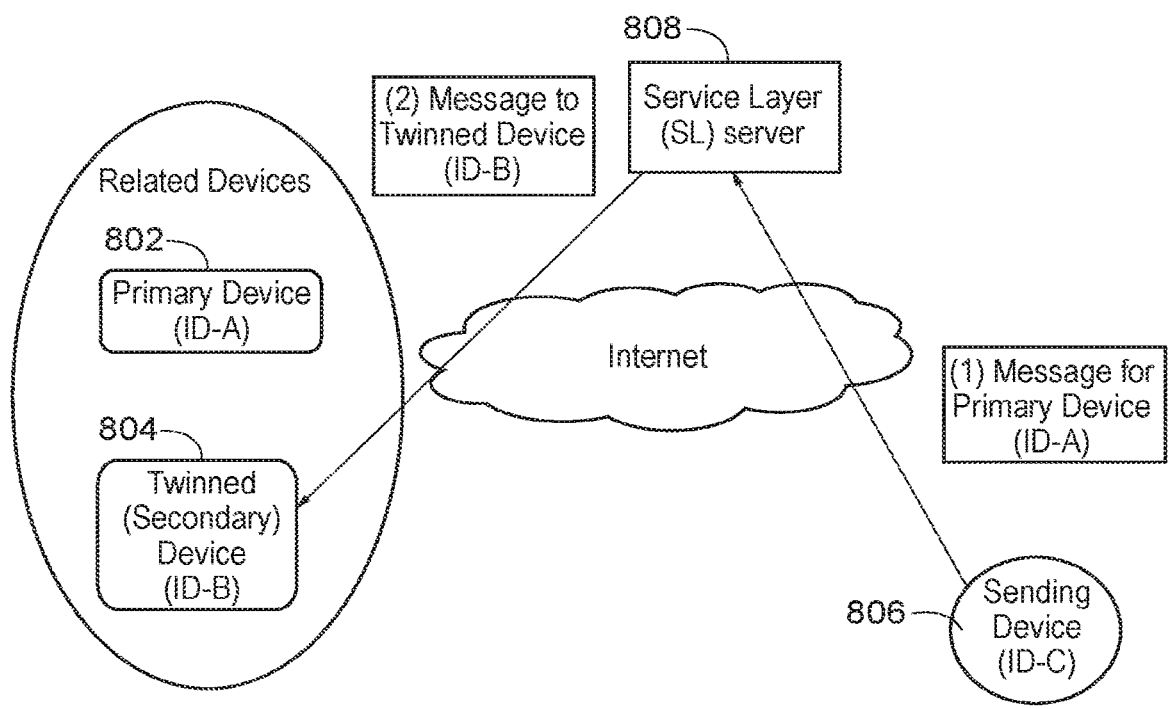
FIG. 8 illustrates a twinning service delivery concept.

FIG. 8 illustrates the concept of a twinning service delivery. In step 1 of FIG. 8, a sending device 806 sends a generic message (e.g. trigger indication, email, video clip, etc.) destined for the primary device 802 which has a network identifier of ID-A. The message is first routed to a service layer (SL) server 808 which, if twinning is activated, can then instead route the message to the twinned (secondary) device 804 in step 2 of FIG. 8. To accomplish this, the SL server 808 is required to be able to switch the destination network identifier of the message to the twinned device 804 (i.e. to ID-B from ID-A). Also the SL sever 808 may trigger other related actions that need to be accomplished as part of the service (e.g. store data, change message format, etc.). All these actions can typically be specified by policies defined in the SL server 808.

Figure 9:
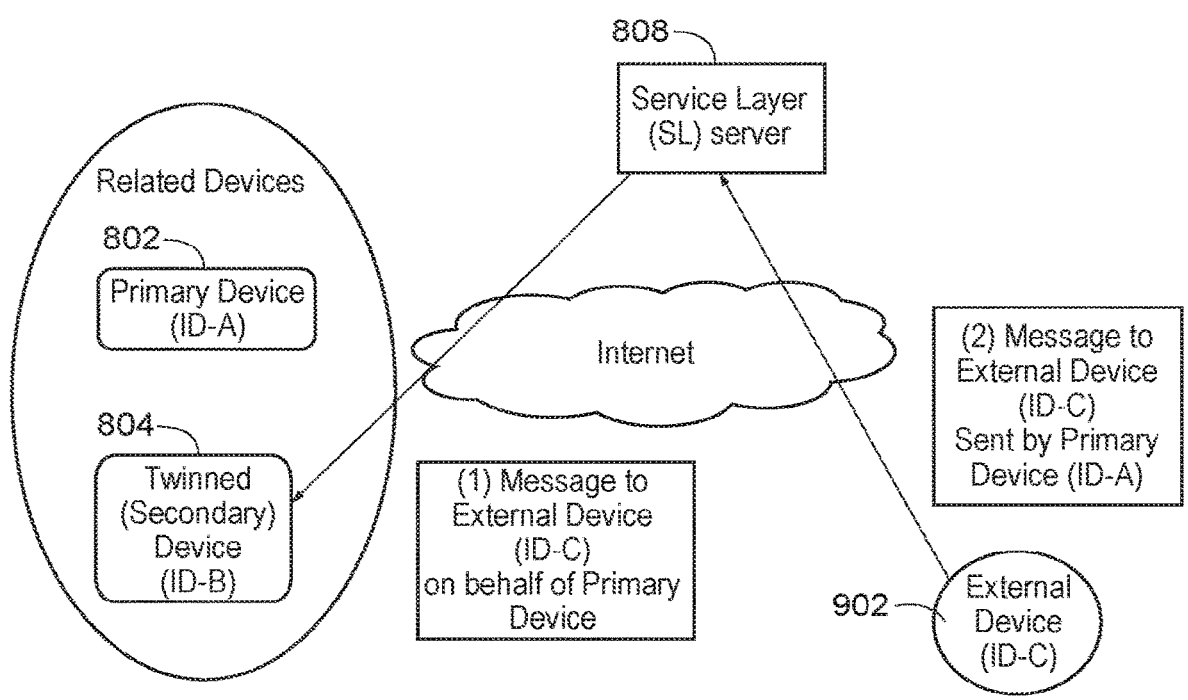
FIG. 9 illustrates a twinning service origination concept.

FIG. 9 illustrates the concept of a twinning service origination. In step 1 of FIG. 9, a twinned (secondary) device 804 sends a generic message (e.g. trigger indication, email, video clip, etc.) on behalf of the primary device 802 destined for an external device 902 which has a network identifier of ID-C. The message is first routed to a SL server 808 which, if twinning is activated, can then route the message to the external device in step 2 of FIG. 9. To accomplish this, the SL server 808 is required to be able to switch the sending device network identifier of the message to ID-A (i.e. from ID-B) which is the network identifier of the primary device 802. Also the SL server 808 may trigger other related actions that need to be accomplished as part of the service (e.g. store data, change message format, etc.). All these actions can typically be specified by policies defined in the SL server 808.

It is instructive to compare the key technical differences between twinning and alternate features such as call forwarding and pairing. Call Forwarding is a popular voice telephony feature which, when activated, redirects a telephone call from one destination (e.g. Phone-A) to another destination (e.g. Phone-B). The redirection can be conditional (e.g. forward only if Phone-A user does not answer after 3 rings). Or the redirection can be absolute (e.g. do not ring Phone-A at all, but instead forward immediately to Phone-B).

Pairing has been popularized recently by Apple Corporation. A given user's Apple watch, for example, can be explicitly paired with his Apple iPhone via a local short-range Bluetooth connection. The main network connection is through the iPhone, and information can then be selectively relayed from the iPhone to the watch as required (based on which applications the user configured to run on the iPhone, watch or both). Note that unlike the current OMA twinning standardization effort, the Apple watch does not currently have a SIM card or a cellular connection capability. All cellular and IP services must first be delivered to the iPhone which can then selectively relay the required service to the watch.

Some of the key differences between twinning and these alternate features are:

Call forwarding is uni-directional only. It delivers calls to one of a given set of devices. However it does not have any feature support for calls originating from any of the set of devices. In contrast, twinning can have bi-directional feature support (i.e. both delivery and origination).

Pairing is a local feature between two devices (e.g. phone and watch), and only one of these devices (e.g. phone) has a connection to the network. The network may not even be aware of the other device (e.g. watch). The network connected device (e.g. phone) can then act as a network relay for the other device (e.g. watch) when the user wants to access a given application on that device (watch). In contrast, twinning does not require a given device to act as a network relay. In other words, in twinning all the devices may be able to communicate with the network directly.

There are also other variations of these services, but in all cases there are some key technical differences as compared to twinning.

The latest twinning specification work in OMA is oriented towards cellular devices with SIMs. The OMA approach also requires real-time manual configuration to enable twinning (e.g. entering activation codes). This approach does not work well for IoT use cases where:

(1) Many IoT devices do not have SIMs
(2) Real-time manual configuration of IoT devices is complex (and sometimes not even feasible)
(3) IoT devices are deployed in groups of related devices.

Currently OMA is only considering twinning of devices that each have a SIM card, as OMA is primarily interested in cellular device use cases. Therefore, IoT devices (that often do not have a SIM card) are not well considered in the current OMA specification effort. Also, OMA requires human manual intervention during the twinning process (e.g. to manually enter activation codes). Finally, other characteristics of IoT devices such as groups of related devices are not well supported by the OMA standardization efforts.

Following are some example of use cases that are not well covered in the current OMA specification effort:

1. Mobile-Phone-A (with SIM) twinning with wearable watch (with no SIM) that monitors health related measurements.
2. Smart watch (with no SIM) that monitors health related measurements twinning with laptop (with no SIM) running health monitoring application.
3. Mobile-Phone-A (with SIM) twinning with a group of entertainment units (TVs, iPods, etc.) with no SIMs that are scattered over multiple rooms of a connected house.
4. Smart watch (with no SIM) twinning with a group of entertainment units (TVs, iPods, etc.) with no SIMs that are scattered over multiple rooms of a connected house The above use case #4 is developed further in the next section to show the value of having a twinning feature that supports IoT devices (without SIMs).

OMA has adopted a Work Item to investigate how to change the OMA protocols to support twinning of mobile devices Twinning Independent Devices (TWIN) presentation (OMA-TP-2014-0128-INP_LookFwd_Wearable_Device_Twinning http://member.openmobilealliance.org/ftp/Public_documents/TP/2014/) and RESTful Network API for Twinning Requirements (OMA-RD-REST_NetAPI_Twin-V1_0-20150407-C "http://technical.openmobilealliance.org/Technical/technical-information/release-program/current-releases/twinning-v1-0")

Some of the reasons identified by OMA for why an OMA twinning standard was needed included:

Establishing a user presence on multiple independently networked devices is already a common UX (User eXperience), e.g. for email, social networking, communication Many new device types are coming to market, e.g. wearables, connected cars, and connected devices in general Many of these devices may have limited UI (User Interface) capabilities Establishing user presence on these devices needs to be simple and effective The market will remain fragmented unless a standard for this is developed It is instructive to look at an OMA Use case from RESTful Network API for Twinning Requirements for "twinning a connected car display to a primary mobile device":

This scenario provides users with the capability to twin a connected car display to his/her primary mobile device.

This would result in the user receiving voice calls and text messages on the car display where the destination for the call/text was the primary device 802. Also, depending on the capability of the car display, the user may originate voice calls or text messaging while the user at the destination would see the call/text originated from the originating user's primary device 802.

The detailed use case description for the above from RESTful Network API for Twinning Requirements is as follows:

1. Tom is a subscriber to the Twinning feature.
2. Tom initiates Twinning activation request from his primary mobile device.
3. Tom is authenticated and authorization of the Twinning operation is granted. Then Tom is prompted on the screen of his primary device 802 (by the API Gateway or a backend system) that he needs to enter a valid Twinning code. Also, the instructions for how to obtain a valid Twinning code is displayed on the screen.
4. Tom follows the instructions and initiates a request for a Twinning code from his secondary device (i.e., car display)
5. API Gateway returns a valid Twinning code to Tom's secondary device which is displayed to Tom.
6. Tom sees the Twinning code and enters the Twinning code into the Twinning activation screen of the primary device 802 (which is waiting for Tom enter the code and press "continue").
7. API gateway in conjunction with the authorization server and Twinning Enabler validates the access token and the Twinning code and sets up the appropriate Twinning association between the primary device 802 and secondary device in the Twinning Enabler. The Twinning status between the primary and the secondary device is set to "On" by default upon twinning activation operation.
8. API gateway provides different OAuth access tokens to both applications on the primary and secondary devices for subsequent operations when/if needed (e.g. Toggle Twinning feature).

OMA is currently defining twinning protocols for the case where both the primary and secondary devices have SIM cards (Enabler Release Definition for RESTful Network API for Twinning OMA-ERELD-REST_NetAPI_Twinning-V1_0-20150407-C and http://technical.openmobilealliance.org/Technical/technical-information/release-program/current-releases/twinning-v1-0)

This is primarily for reasons of controlling security and charging for twinning scenarios using cellular infrastructure.

This section details a use case (that is not supported in today's technology) for a twinning service involving a group of IoT devices in a house setting. In the use case, the primary device 802 is the smart watch. The secondary device is not a single device but instead a group of related IoT devices (i.e. a group of display devices in the house which are characterized as TVs but could also be computer displays, tablets, etc.). The twinning service is essentially that any home security alarm message meant to be displayed on the smart watch (primary device 802) can instead be displayed on all the TVs (secondary device group) in the house. If the smart watch is not at home, then the twinning service is not triggered and instead the alarm message is displayed only on the primary device 802 which is the smart watch.

Figure 10:
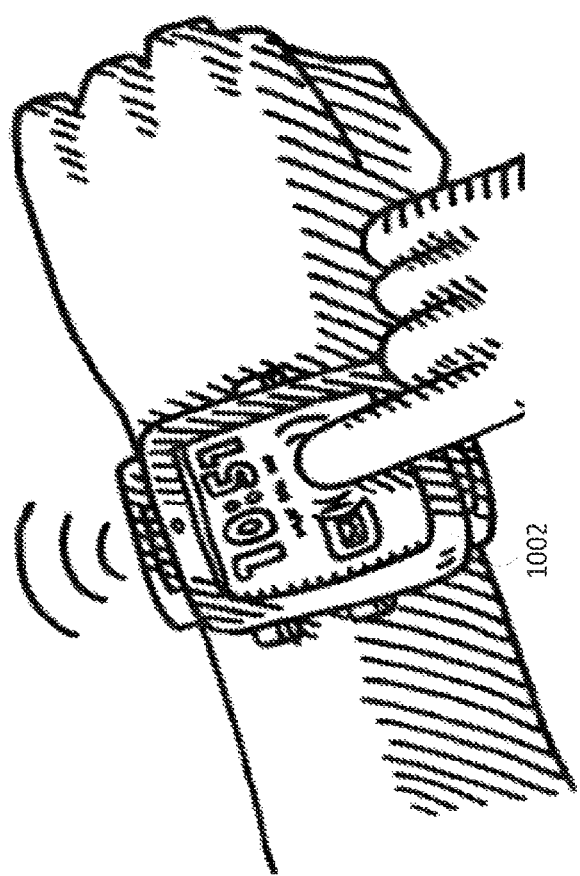
FIG. 10 illustrates a user activating twinning service.

The use case starts off with the home owner entering his house and turning on his "Home Security—group notification mode" via his smart watch 1002 of FIG. 10.

As shown in FIG. 11A, sometime later, the home owner 1102 is sitting in his Den and watching TV 1104. At that moment, a neighbor's child playing baseball accidently throws a ball into the home owner's kitchen window and breaks the window. The home security system immediately detects the damage to the kitchen window. The group twinning service is then triggered and a notification 1106 is displayed on every TV screen in the house as shown in FIG. 11A. Note, if the group twinning service had not been active then the notification would only have been displayed on the home owner's smart watch 1002.

Figure 11B:
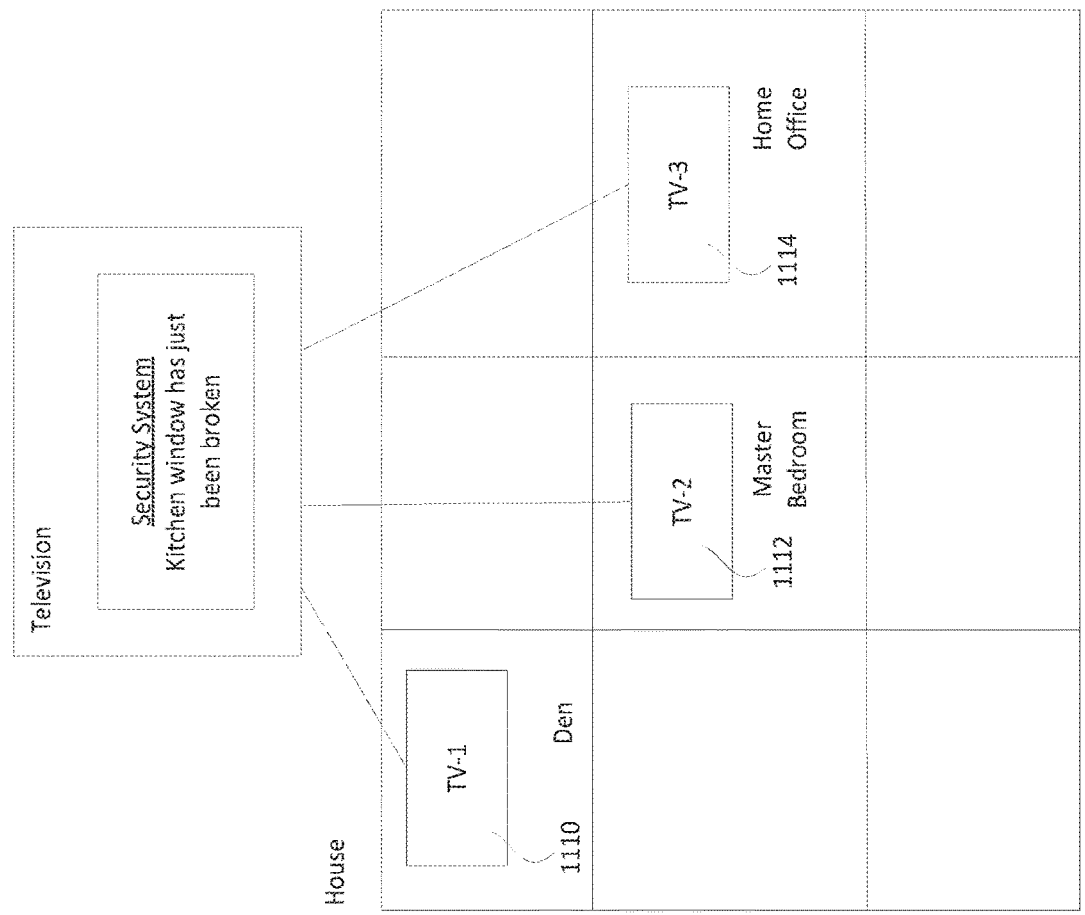
FIG. 11B illustrates a twinning service for group devices delivered.

Finally, FIG. 11B shows the group twinning message being displayed on each of the three TVs 1110, 1112 and 1114 in the house. The same message is shown on the screen of all the group of IoT devices. The message being displayed is "Security System—Kitchen window has just been broken". This can allow any other occupant of the home (in addition to the home owner) to be aware of the security alert.

The main gaps are in support of twinnable IoT devices (without SIMs), and also supporting twinning groups of related devices (instead of a single secondary device). Also, the current OMA twinning approach requires the user to manually activate the twinning feature between his cell phone and a secondary device (e.g. by entering a twinning authorization code in the devices). This approach does not scale for IoT use cases which may have groups of related devices that may be candidate for twinning, and for which real-time manual configuration is typically not easy.

Figure 12:
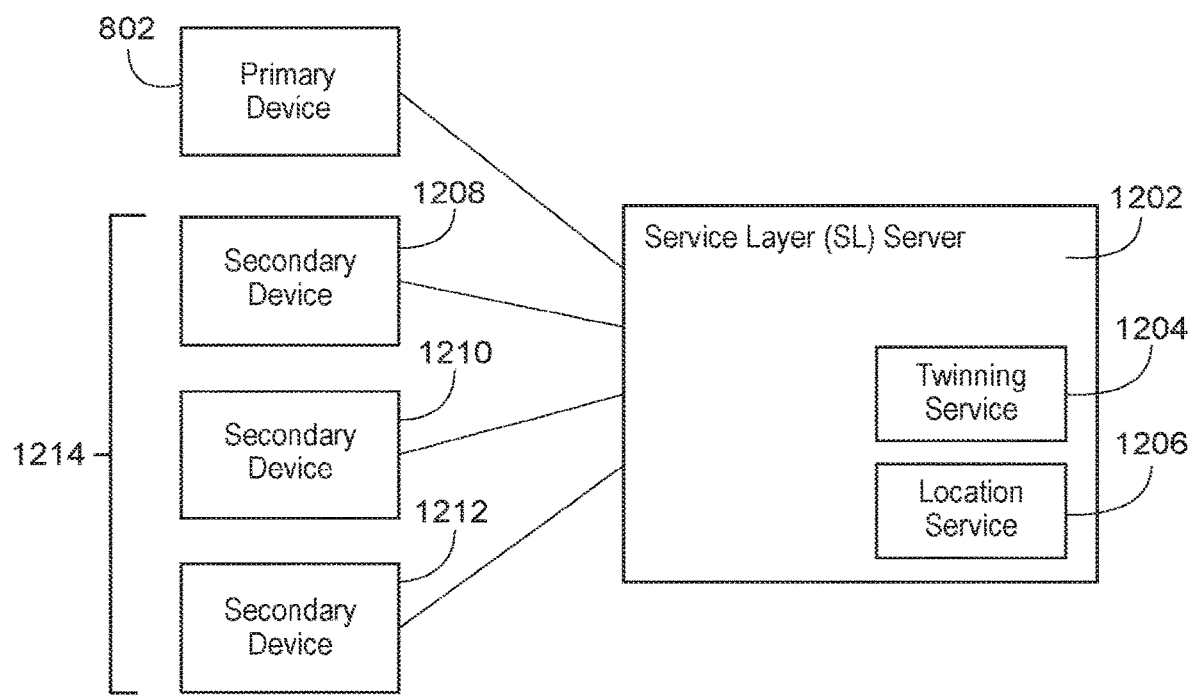
FIG. 12 illustrates a twinning service apparatus of one embodiment.

FIG. 12 shows a Service Layer (SL) server 1202. The Service Layer (SL) server 1202 can be an LWM2M server or some other type of server. The Service Layer (SL) server 1202 can include a twinning service 1204 and location service 1206. The twinning service 1204 can maintain the twinning groups and the redirection of messages to or from the devices of the twinning groups. Location service 1206 can determine the location of the primary device 802 to determine if the primary device 802 is in a location that is appropriate to activate the twinning service 1206.

It is understood that the functionality illustrated in FIG. 12, may be implemented in the form of software (i.e., computer-executable instructions) stored in a memory of, and executing on a processor of, a node of an M2M network (e.g., a server, gateway, device, or other computer system), such as one of those illustrated in FIG. 27C or 27D described below.

Figure 13:
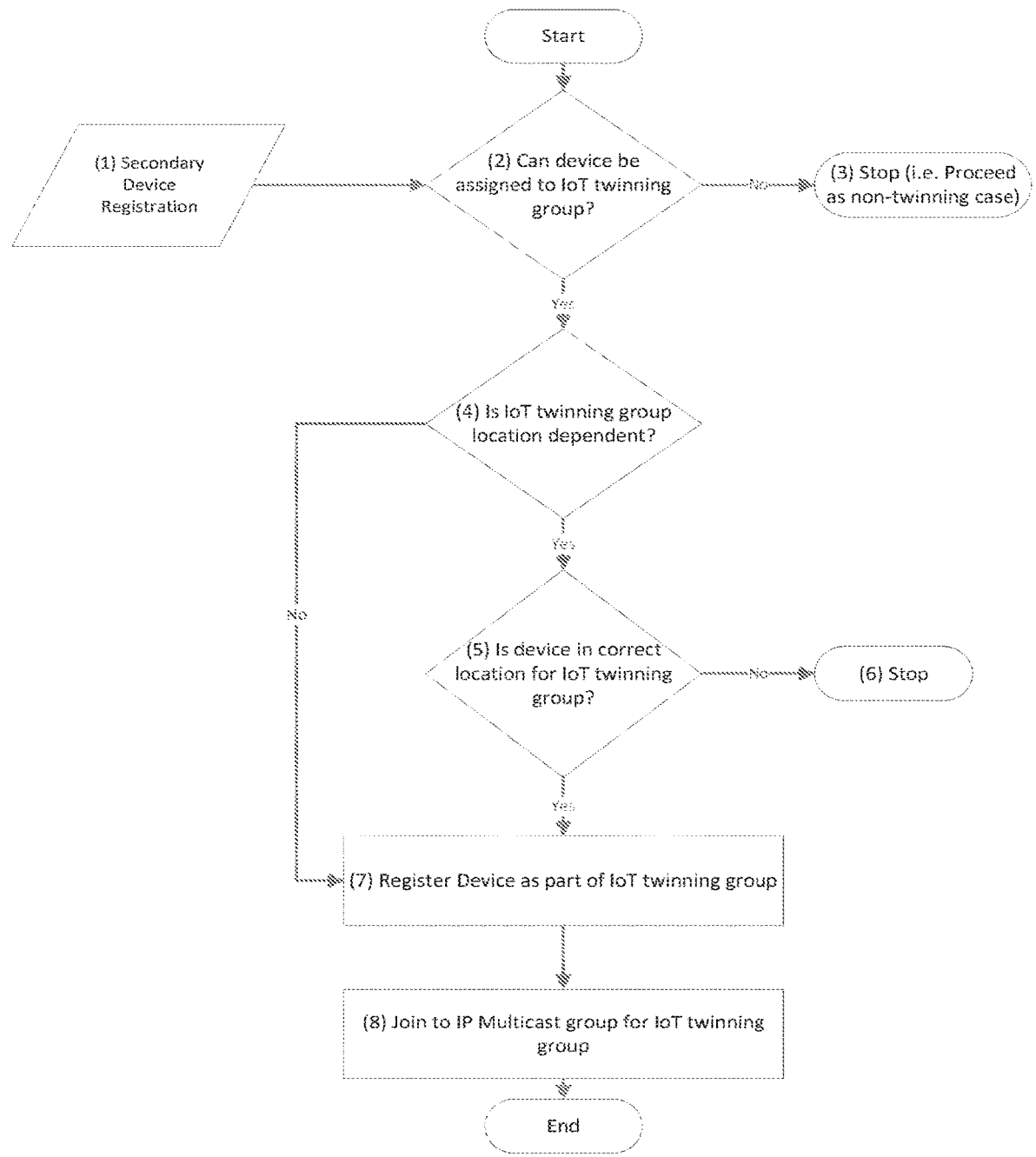
FIG. 13 illustrates a service layer server flowchart for twinning group formation.

FIG. 13 shows a flowchart for IoT twinning group formation at the SL server 1202 with the following steps:

In step 1 of FIG. 13, a secondary IoT device associated with the SL server 1202 registers. The registration can include identifying information such as the type and function of the device, location information, a device identifier such as IP address, Service Layer identifier, Application Identifier, or Device Hardware Identifier, a network password, manufacturer identifier, etc.

In step 2 of FIG. 13, based on the received information the SL server 1202 determines if the device can be assigned to a twinning group 1214. For example, all the devices capable of a certain function (e.g. camera monitoring, displaying video, or generating music) may be candidates for being assigned as part of a twinning group for that specific function.

In steps 4 and 5 of FIG. 13, the SL server 1202 then checks if the candidate twinning group 1214 for the device is location dependent (e.g. all the cameras must be located in a given room of a house), and if so, is the device in the correct location? Candidate members may also be checked for other factors such as their sleep schedule, transmission bitrate, manufacturer compatibility, etc. (not shown).

In steps 6 and 7 of FIG. 13, the SL server 1202 internally associates the device as part of a twinning group if it passes all the checks. Otherwise it stops the process.

In step 8 of FIG. 13, if possible, the SL server 1202 triggers the device to join an IP multicast group (e.g. see Group Communication for the Constrained Application Protocol (CoAP)—RFC 7390). This can allow for efficient future interaction between the SL and the twinning group 1214. (If not possible, then the SL server 1202 can still contact the devices in the twinning group 1214 via serial unicast, broadcast or other mechanisms for distributing information to groups. For simplicity, the rest of this document can assume that the twinning group devices are part of an IP multicast group.) The trigger message that is sent to the device can include identifying information for the IP multicast group and may include identifying information for the twining group 1214.

At the end of this process the following Identification information can be available in the SL server 1202 for the twinning process:

Secondary Devices 1208, 1210 and 1212:
  IP multicast (group) address
    May be assigned per normal multicast IP address assignment procedures (e.g. IANA Guidelines for IPv4 Multicast Address Assignments—RFC 5771 https://tools.ietf org/html/rfc5771).
  Service Layer Twinning Group ID
    Assigned by the SL server 1202
    a given secondary device may be assigned to 1 or more independent Twinning Groups
Primary device 802:
  Unicast IP address
    Assigned per normal IP address assignment procedures (e.g. DHCP Dynamic Host Configuration Protocol (DHCP)—RFC 2131 https://tools.ietforg/html/rfc2131)
    The Primary device 802 would have to be pre-provisioned to be associated with a given Twinning Group (i.e. Service Layer Twinning Group ID). The pre-provisioning may be manual or through some application logic. There cannot be more than one primary device 802 connected to a given Twinning Group. However, a given primary device 802

Figure 27A:
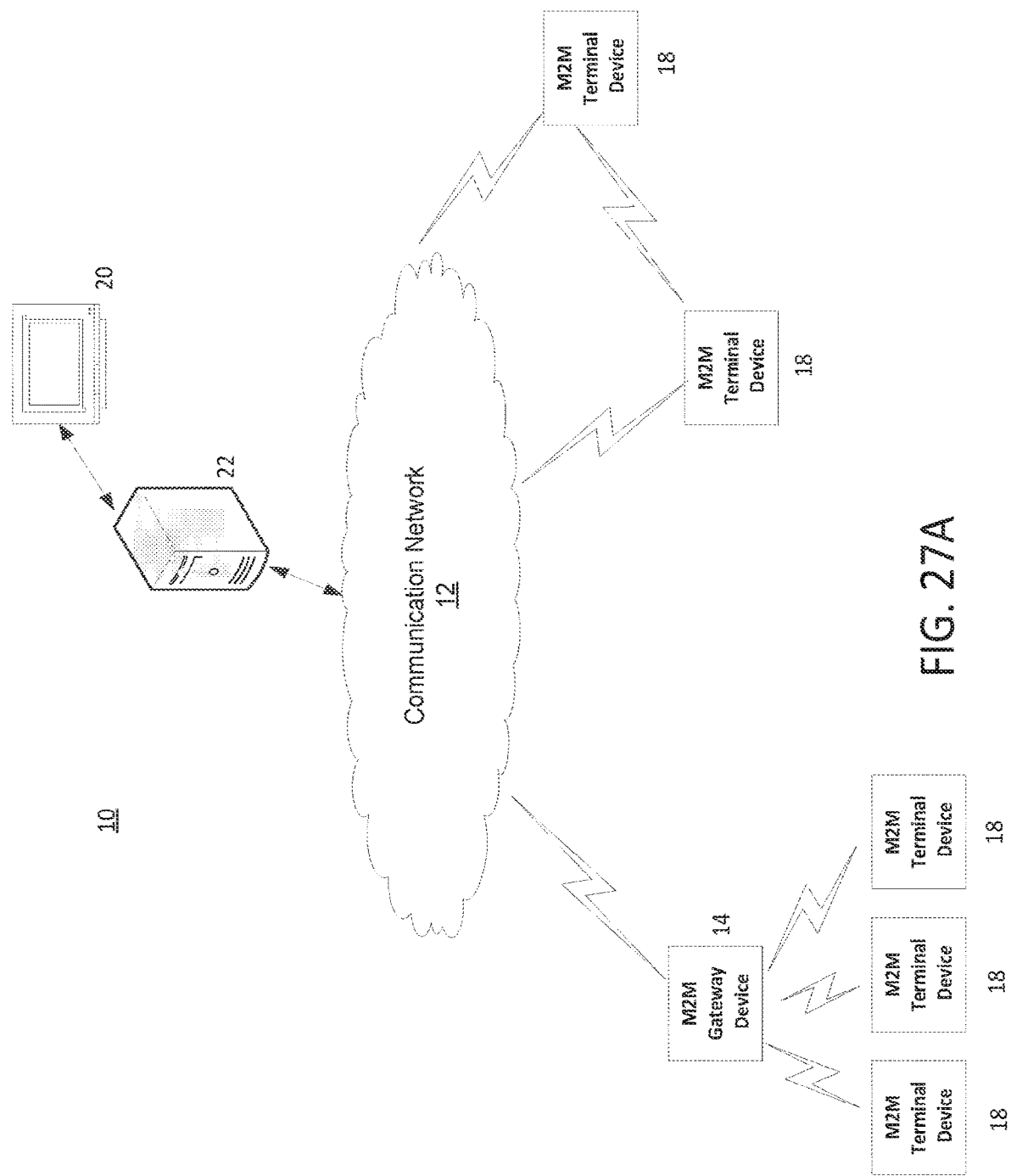
FIG. 27A is a diagram of an example machine-to machine (M2M), Internet of Things (IoT), or Web of Things (WoT) communication system in which one or more disclosed embodiments may be implemented.
Figure 27B:
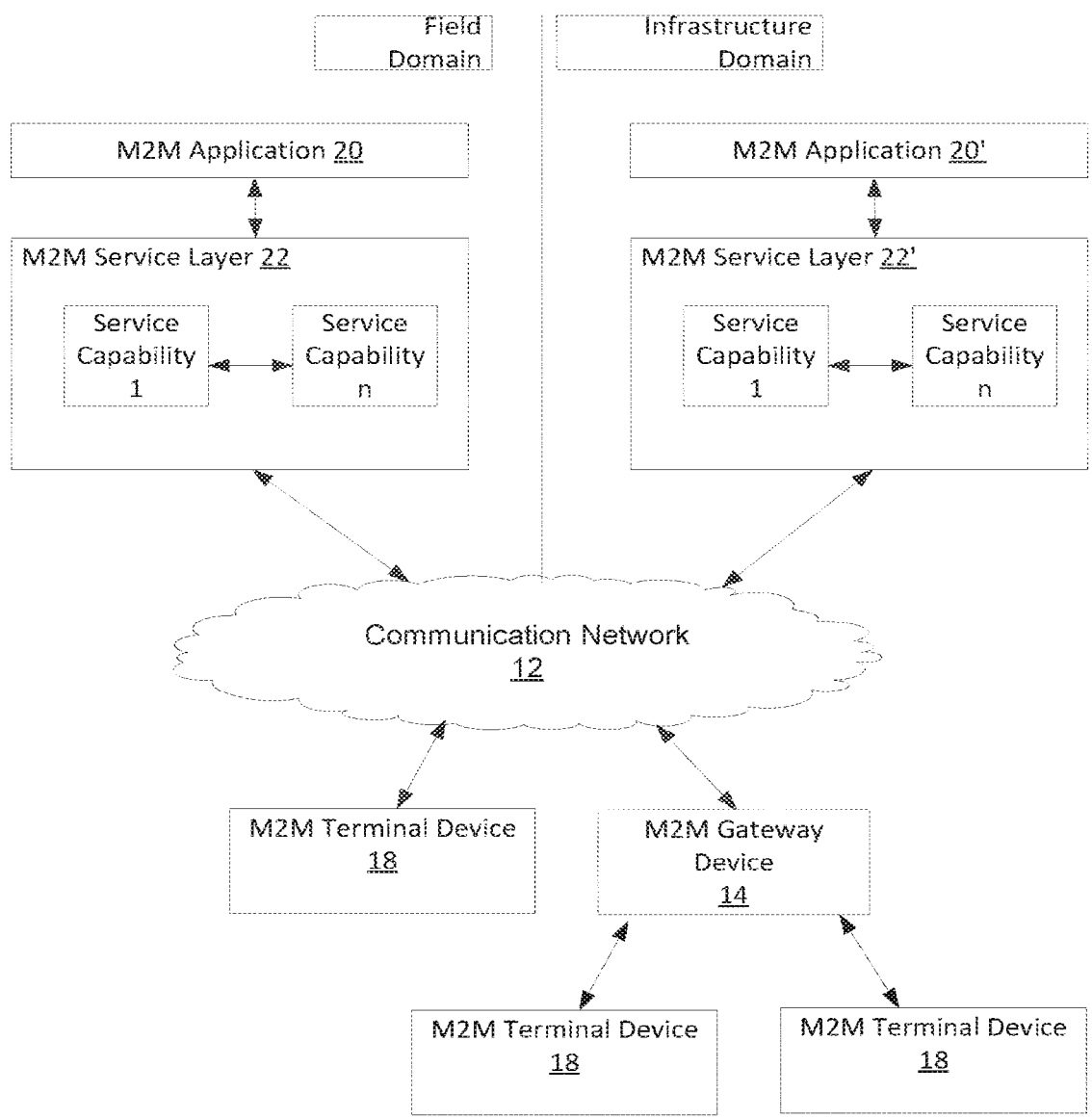
FIG. 27B is a diagram that illustrates an M2M service layer.
Figure 27C:
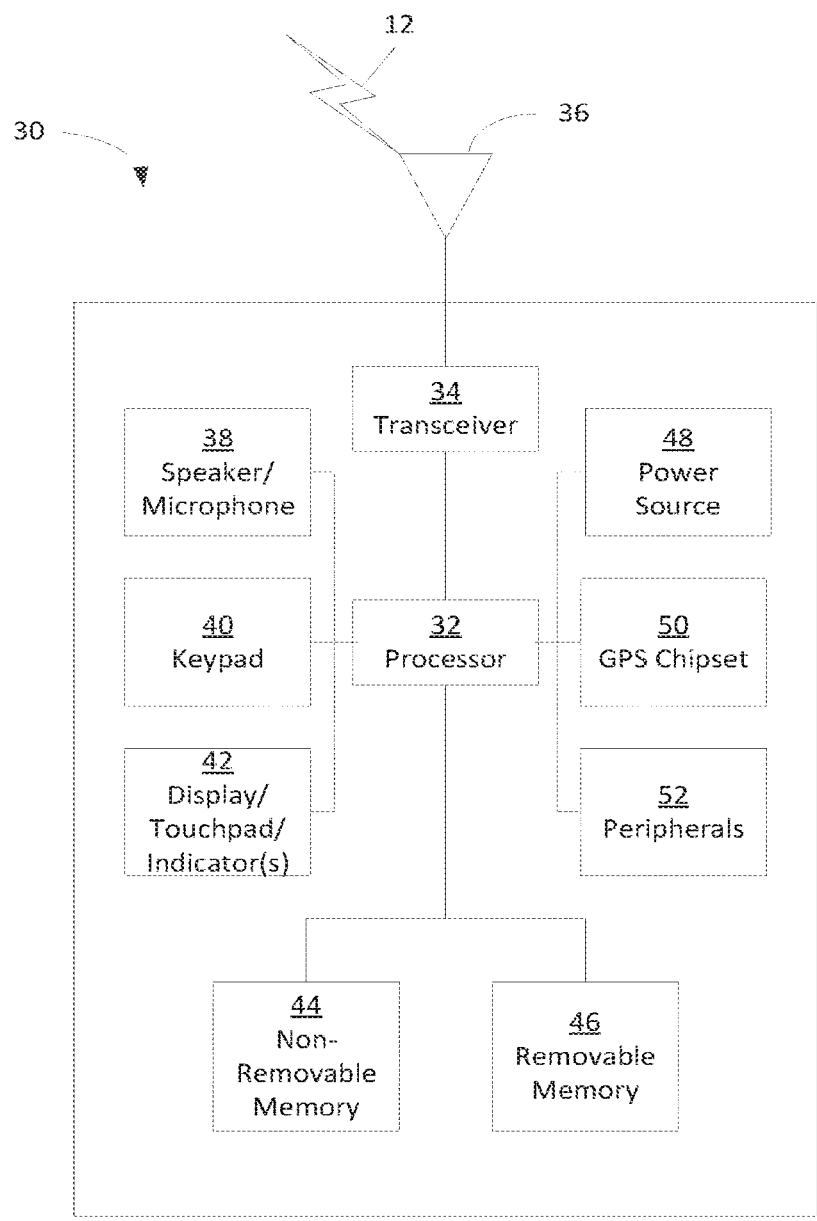
FIG. 27C is a block diagram of an example hardware/software architecture of a M2M network node.
Figure 27D:
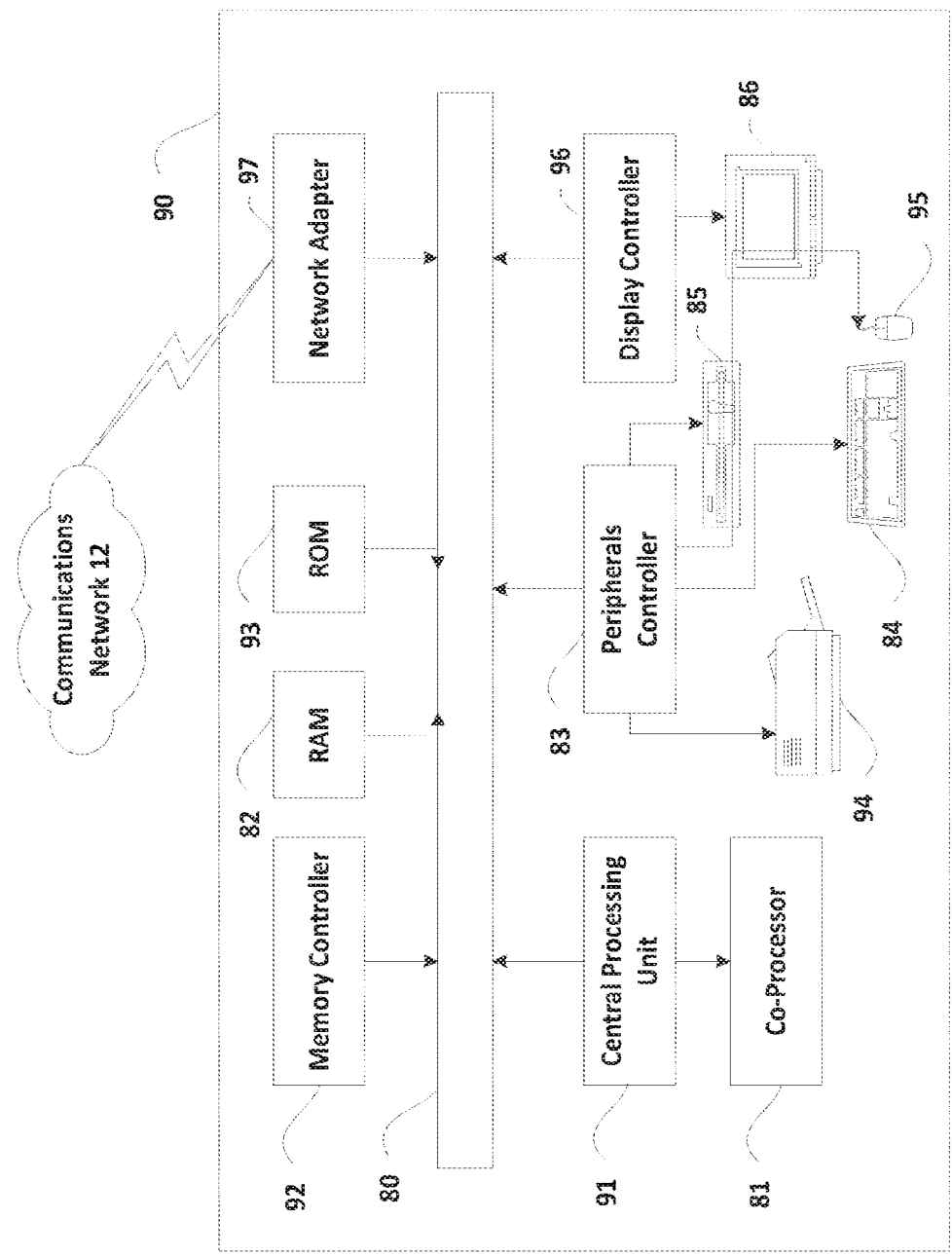
FIG. 27D is a block diagram of an exemplary computing system which may also be used to implement one or more nodes of an M2M network.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 27C or FIG. 27D. That is, the method(s) illustrated in FIG. 13 may be implemented in the form of software (i.e., computer-executable instructions) stored in a memory of a network node, such as the node or computer system illustrated in FIG. 27C or FIG. 27D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

Figure 14:
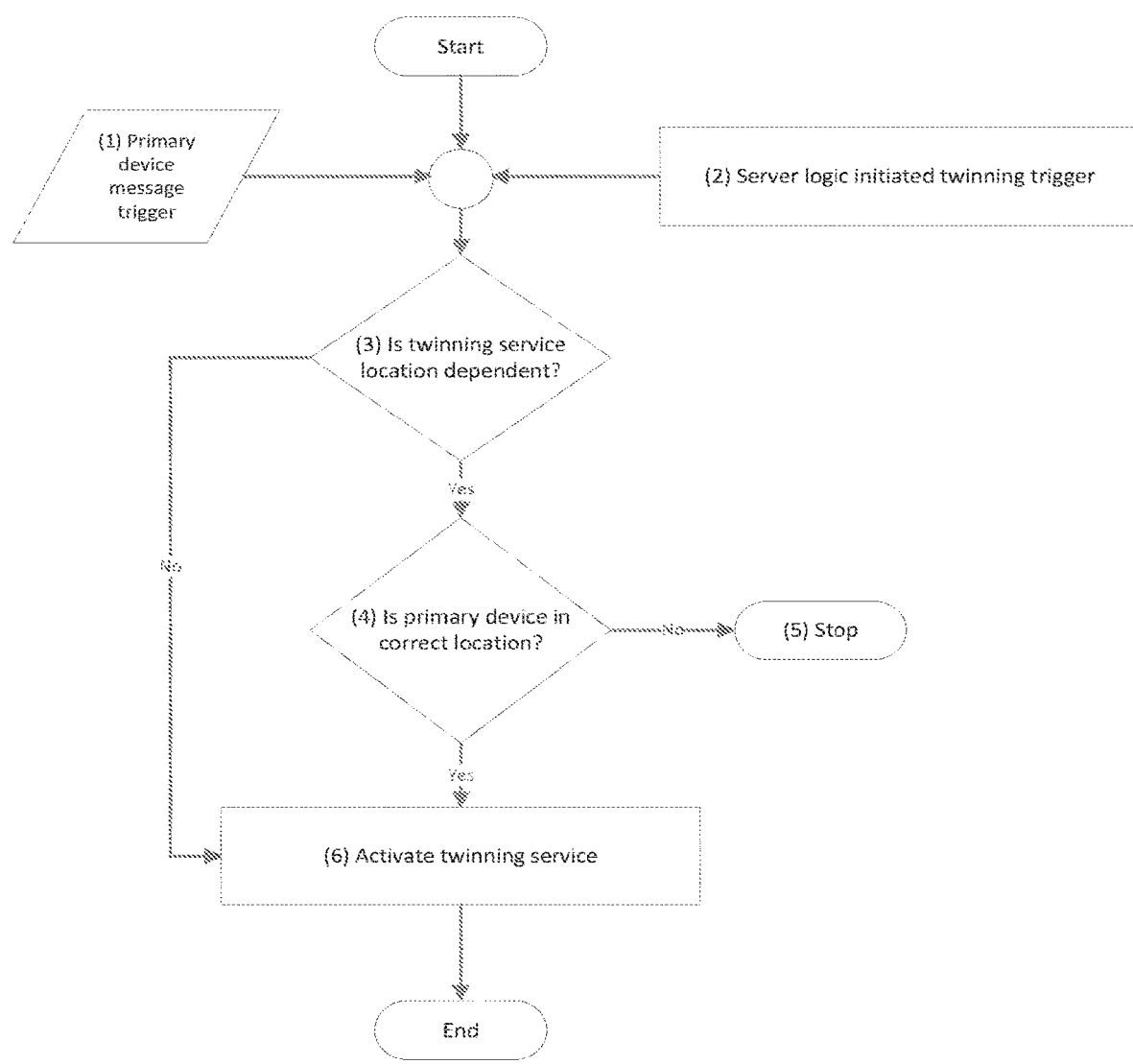
FIG. 14 illustrates a service layer server flowchart for twinning group service activation.

FIG. 14 shows a flowchart for IoT twinning group service activation at the SL server 1202 with the following steps:

In step 1 of FIG. 14, the primary device 802 (associated with a given twinning group) sends a message that indicates that the given twinning group 1214 should be activated. The message may also include the location of the primary device 802.

In step 2 of FIG. 14, the trigger may also be internally generated by the SL server logic (for example a given twinning group may be activated at a given time of day).

In steps 3-5 of FIG. 14, the SL server 1202 then checks if the twinning service is location dependent and if the primary device 802 is in the correct location. The SL server 1202 may also check other conditions such as time of day, etc. (not shown).

In step 6 of FIG. 14, if all the conditions are met then the SL server 1202 records internally that the given twinning group service is now activated.

The reverse process of deactivating the twinning group service can be a similar but simpler process. Specifically, the primary device 802 can send a message to the SL server indicating deactivation. The SL server 1202 can also decide to deactivate the twining service 1214 for particular group members based on an internal logic trigger. An example of a trigger may be a device changing its location, acquiring a new IP address, re-authorizing, re-authenticating, etc. Then the SL server 1202 can mark the given twinning group service as deactivated.

It is understood that the entities performing the steps illustrated in FIG. 14 are logical entities that may be implemented in the form of software (i.e., computer-executable instructions) stored in a memory of, and executing on a processor of, a network node or computer system such as those illustrated in FIG. 27C or FIG. 27D. That is, the method(s) illustrated in FIG. 14 may be implemented in the form of software (i.e., computer-executable instructions) stored in a memory of a network node, such as the node or computer system illustrated in FIG. 27C or FIG. 27D, which computer executable instructions, when executed by a processor of the node, perform the steps illustrated in FIG. 14. It is also understood that any transmitting and receiving steps illustrated in FIG. 14 may be performed by communication circuitry of the node under control of the processor of the node and the computer-executable instructions (e.g., software) that it executes.

Figure 15:
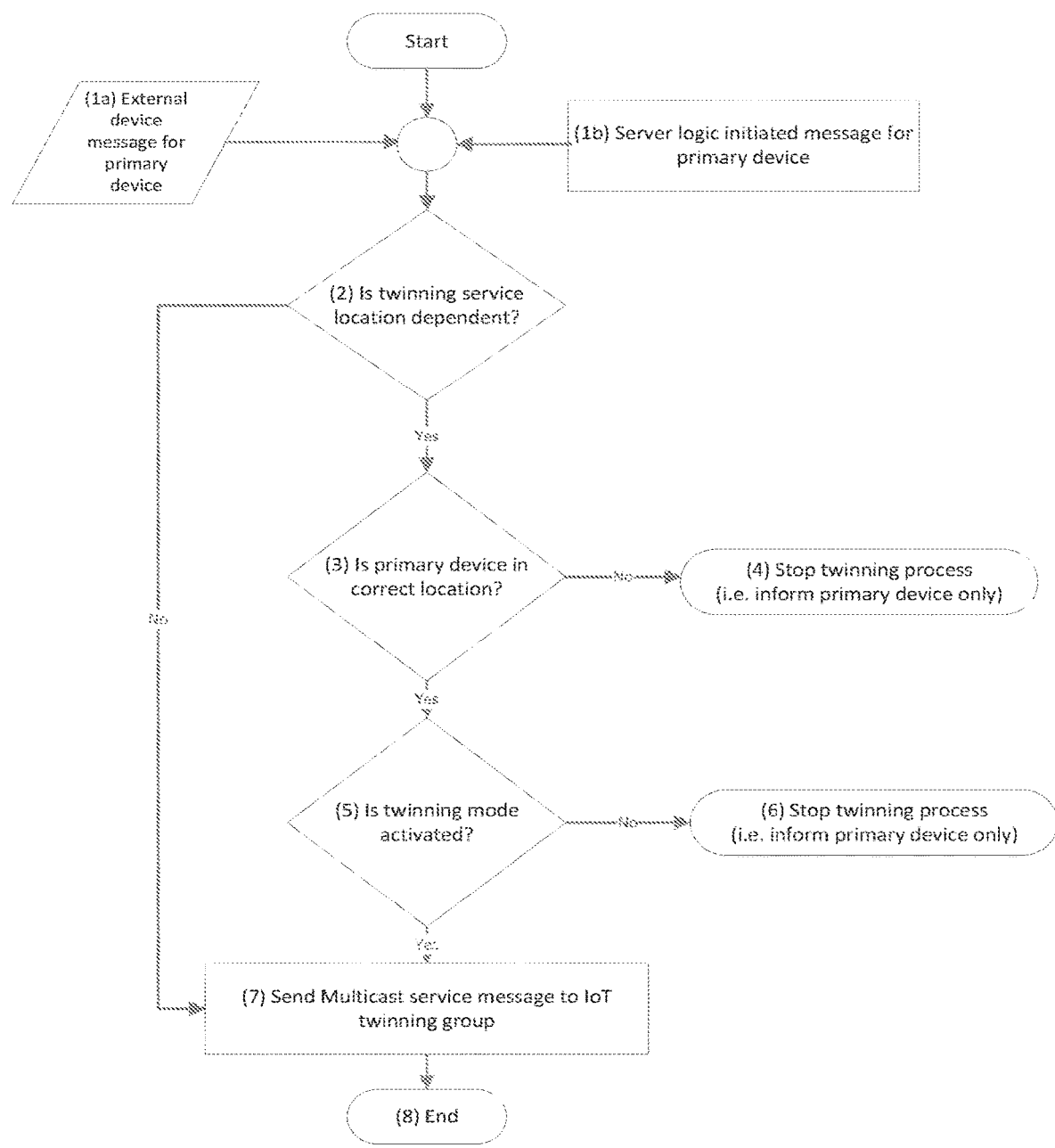
FIG. 15 illustrates a service layer server flowchart for service trigger and delivery to twinning groups.

FIG. 15 shows a flowchart for service delivery to Twinning Groups by the SL server 1202 with the following steps:

In steps 1a-1b of FIG. 15, a third party device (e.g. typically associated with a given service such as an alarm controller), sends a message for the primary device 802. Or, alternatively, internal trigger logic in the SL server 1202 could initiate the message.

In steps 2-3 of FIG. 15, the SL server 1202 checks if the given twinning service is location dependent, and if so is the primary device 802 in the correct location. The SL may also check other conditions such as time of day, etc. (not shown).

In step 5 of FIG. 15, then the SL server 1202 checks if the twinning service is currently active.

In steps 4 and 6 of FIG. 15, if the primary device 802 is not in the correct location or the twinning service is not active (or one of the other conditions is not met), then the twinning process is stopped, and the message is delivered directly to the primary device 802 (i.e. nothing is delivered to the twinning group).

In step 7 of FIG. 15, if all the conditions are met, the SL server 1202 then sends any required service related multicast message to all the twinning group members. Also the SL sever 1202 may trigger other related actions that need to be accomplished as part of the service (e.g. store data, change message format, etc.). All these actions can typically be specified by policies defined in the SL server 1202.

In the typical case, a twinned service is re-directed only to the secondary devices 1208, 1210, and 1212 (i.e. IoT twinning group members). However, if the SL server 1202 policy dictates it, a twinned service may also be mirrored onto the primary device 802 in addition to its being twinned to the secondary devices 1208, 1210, and 1212.

A given secondary device may belong to multiple independent twinning groups. It is possible then that two or more services may try to deliver messages to a given secondary device at the same time. In that case, a twinning service priority level should be assigned to each service so that proper prioritization can be made at both the SL server 1202 and the secondary device in terms of processing, displaying, etc. of the simultaneous twinning services.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 27C or FIG. 27D. That is, the method(s) illustrated in FIG. 15 may be implemented in the form of software (i.e., computer-executable instructions) stored in a memory of a network node, such as the node or computer system illustrated in FIG. 27C or FIG. 27D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

Figure 16:
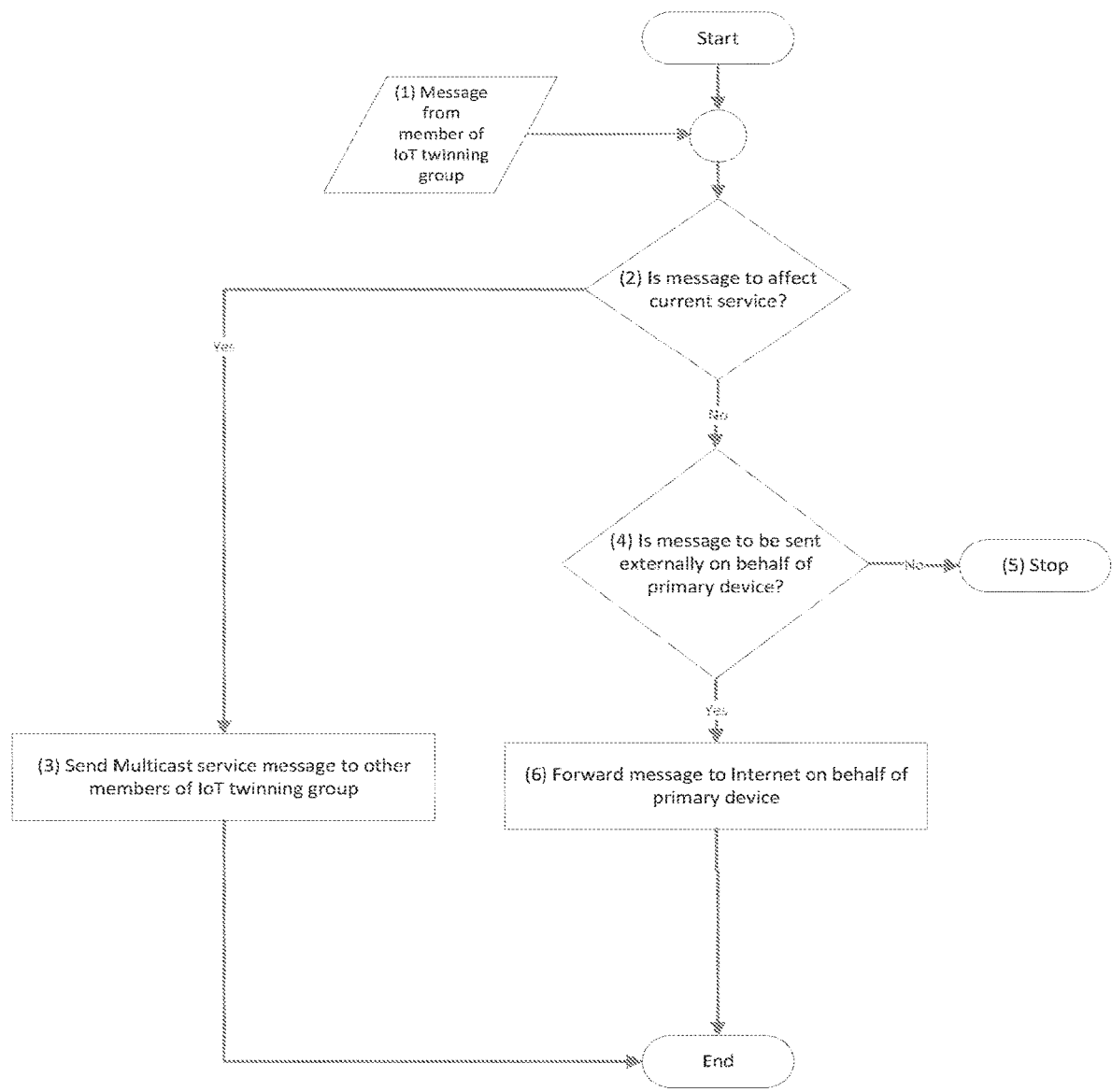
FIG. 16 illustrates a service layer server flowchart for service originating from twinning groups.

FIG. 16 shows a flowchart done at the SL server 1202 for service delivery originating from Twinning Groups with the following steps:

In step 1 of FIG. 16, a member of the IoT twinning group sends an originating message to the SL server 1202.

In step 2 of FIG. 16, the SL server 1202 checks if the message affects the state of the current service.

In step 3 of FIG. 16, if it does, then the SL server 1202 sends a multicast service message to all other member of the groups. Also the SL sever 1202 may trigger other related actions that need to be accomplished as part of the service (e.g. store data, change message format, etc.). All these actions can typically be specified by policies defined in the SL sever 1202.

In step 4 of FIG. 16, if the received message is not meant to affect the current service, then the SL server 1202 checks if it instead to be sent externally on behalf of the primary device 802.

If not, in step 5 of FIG. 16, the process stops. If so, in step 6 of FIG. 16, the SL server 1202 then sends to the message into the IP network on behalf of the primary device 802. A key point as part of this step is that the SL server 1202 can switch the network address (of the originator) from the IoT twinning group member (secondary device 1208, 1210, and 1212) to that of the Primary device 802. Also the SL sever 1202 may trigger other related actions that need to be accomplished as part of the service (e.g. store data, change message format, etc.). All these actions can typically be specified by policies defined in the SL sever 1202.

It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 27C or FIG. 27D. That is, the method(s) illustrated in FIG. 16 may be implemented in the form of software (i.e., computer-executable instructions) stored in a memory of a network node, such as the node or computer system illustrated in FIG. 27C or FIG. 27D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

This section provides a detailed embodiment of how to achieve service delivery for a group of twinned IoT devices using the OMA LWM2M protocol with the enhancements outlined in this disclosure. (Note that the OMA LWM2M protocol utilizes the CoAP family of standards for its underlying mechanism). Specifically, the previous use case of the home alarm system is further developed. The primary device 802 in this use case is the smart watch. The twinning group of secondary IoT devices is the group of TVs in the house. The twinning service is essentially that any incoming security alert message meant to be displayed on the smart watch (while it is at home) can instead be displayed simultaneously on all the TVs (secondary device group) in the house. If the smart watch is not at home then the twinning service is not triggered and instead the message is simply displayed on the primary device 802 which is the smart watch.

Figure 17:
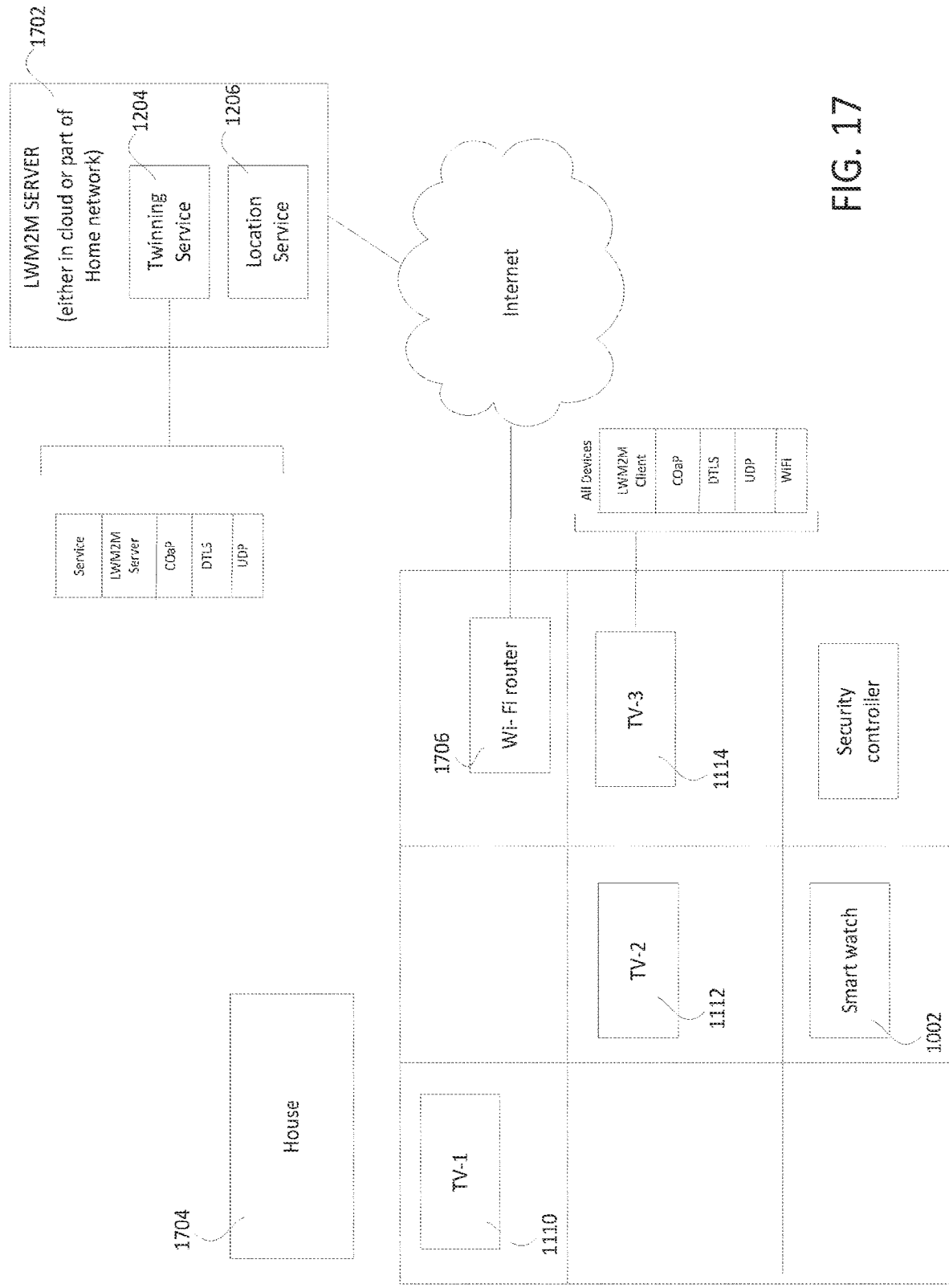
FIG. 17 illustrates a network architecture for group twinning service in the home.

FIG. 17 shows a network architecture for the Twinning service 1204 for IoT groups. The SL server in this scenario is the LWM2M server 1702 which can be located in the Internet cloud or alternatively can be located at the premise housing the IoT devices (i.e. in this case the home 1704). As shown, the SL server has a new Twinning Service 1204 in addition to other more well-known features such as Location service 1206. A Wi-Fi router 1706 provides the IP connectivity (possibly going through the Internet) between the TV screens 1110, 1112 and 1114 (equipped with Wi-Fi) and the LWM2M server 1702.

All the devices in the house (i.e. TVs, smart watch, and security controller) are LWM2M clients and thus run the LWM2M protocol over CoAP and protected by a DTLS connection. DTLS can provide a strong security foundation (e.g. authentication, encryption) for the twinning service.

Figure 18:
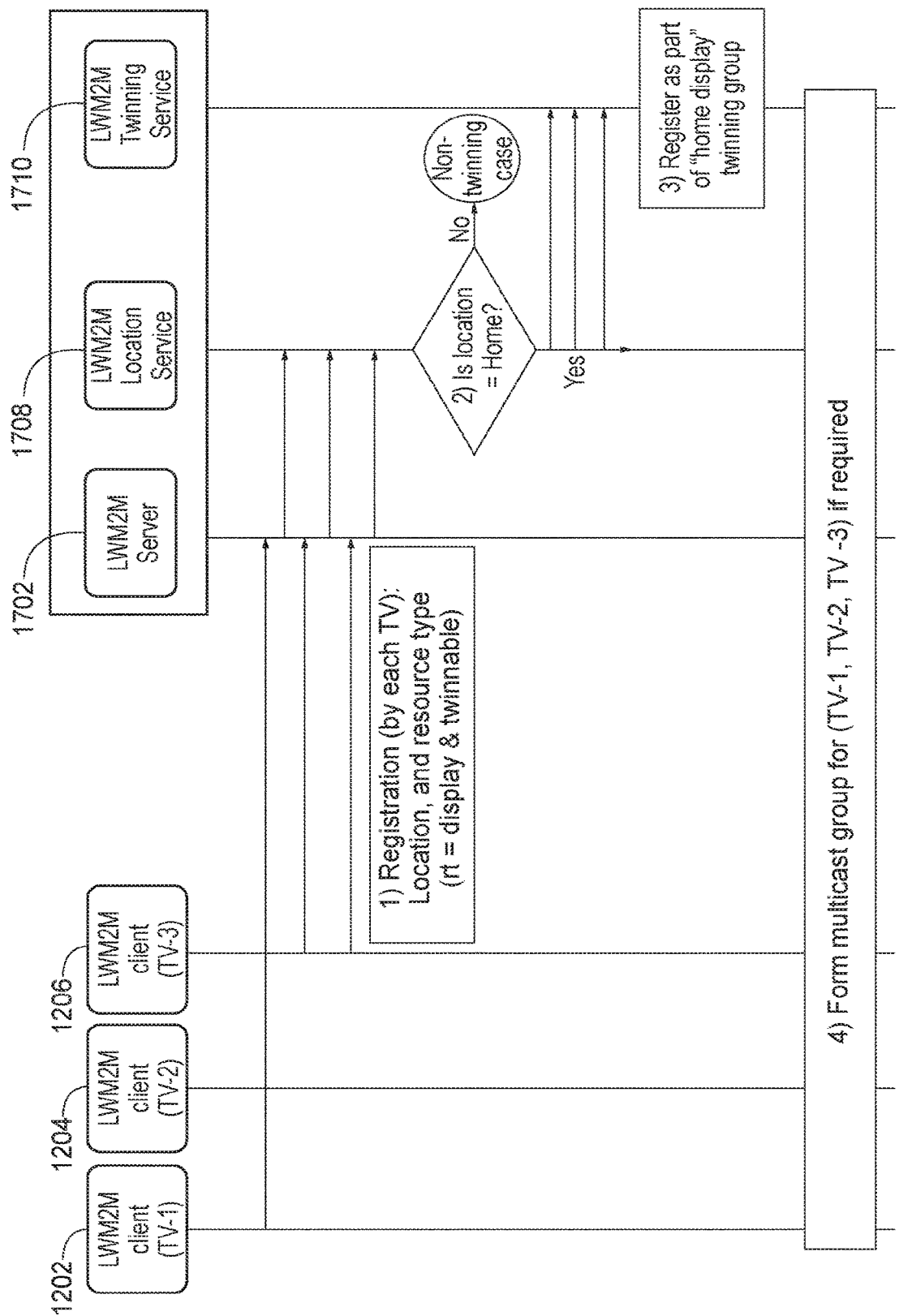
FIG. 18 illustrates a twinning group formation phase.

FIG. 18 shows the twinning group formation phase with the following steps:

In step 1 of FIG. 18, the TVs (i.e. secondary devices 1208, 1210, and 1212) all have a LWM2M client and register at first power on to the LWM2M server 1702. They indicate through a LWM2M registration to the LWM2M server 1702 that they are twinnable (i.e. willing to be secondary devices 1208, 1210, and 1212 in a twinning scenario) and that their main function is to be a display screen. They also indicate their location through, for example, indoor positioning system coordinates.

It is assumed that the entities involved in twinning procedures described in this section first go through normal LWM2M procedures for discovery, registration, security, etc.

In step 2 of FIG. 18, when the LWM2M server 1702 receives the registration it first checks if the location is the home or not. Other checks such as sleep schedule of the device, transmission rate, etc. may be done (not shown). If any of the checks fail then it proceeds as if in a non-twinning case.

The LWM2M server 1702 has several sub-components including a Location Service 1206 and a Twinning Service 1204.

In step 3 of FIG. 18, if all the checks pass, then the twinning service can then register all the TVs as part of a "home display" twinning group.

In step 4 of FIG. 18, if required the LWM2M twinning service 1204 can then trigger the TVs to all join an IP multicast group. This can allow for more efficient group communication in subsequent steps.

Figure 19:
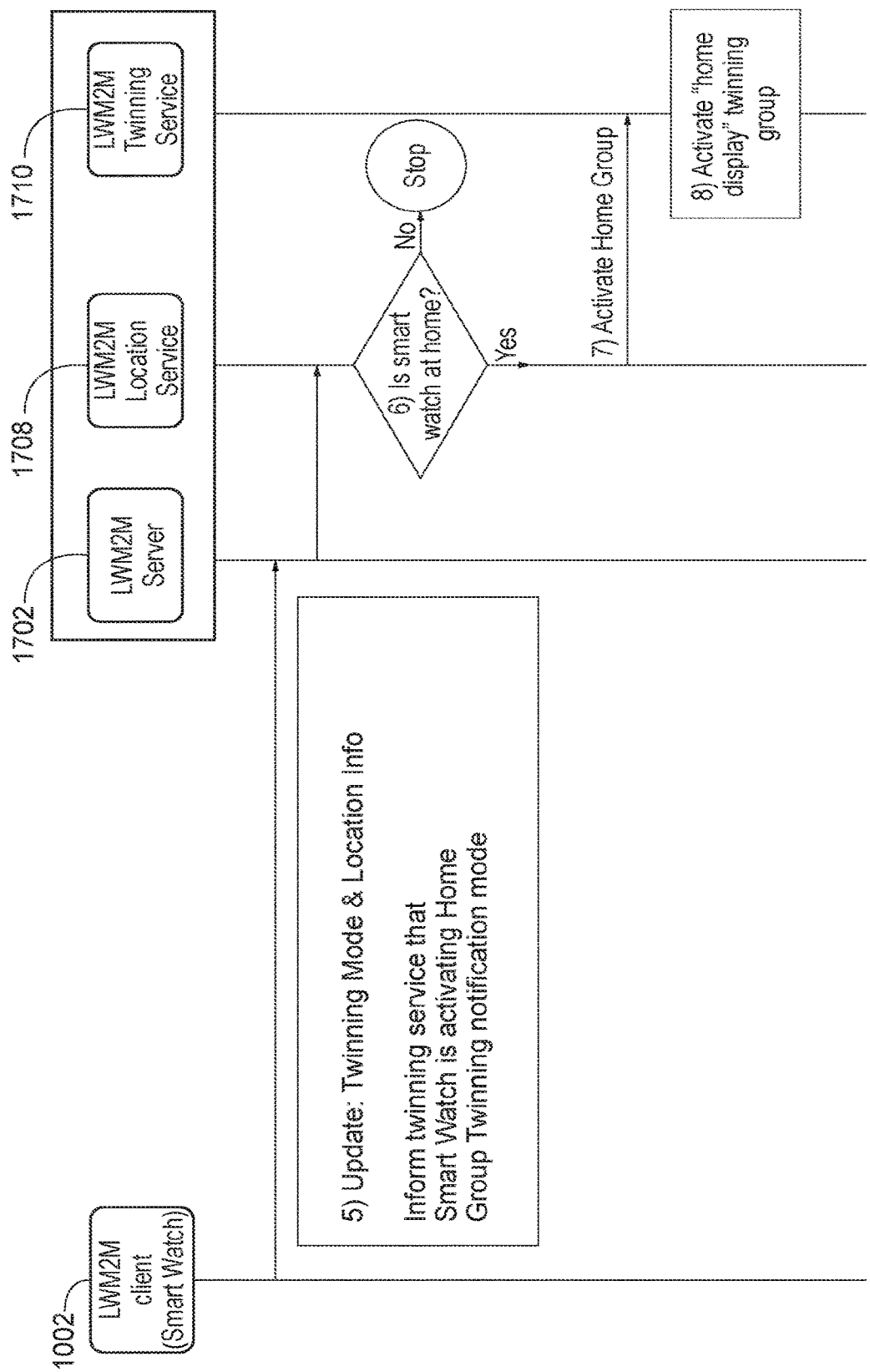
FIG. 19 illustrates a twinning group service activation phase.

FIG. 19 shows the activation phase of the twinning group service with the following steps:

In step 5 of FIG. 189, the smart watch (i.e. primary device 802) activates the home group twinning mode. This could either be manually triggered by the user, or for example triggered by location (e.g. when the user walks into the house). The watch then sends an LWM2M update message to the LWM2M server 1702 which includes its location information through for example indoor positioning system coordinates. It is assumed that the smart watch was previously (not shown) registered as the primary device 802 with the LWM2M server 1702. This would typically have been done manually or through some application logic.

In step 6 of FIG. 19, the LWM2M server 1702 can then check the location of the watch. Other checks may also be done such as time of day, etc. (not shown). If the watch is not at home then the twinning service will not be triggered as this service is only applicable at home.

In steps 7 and 8 of FIG. 19, if the watch is at home (and all other required checks pass), then the twinning service is activated.

Figure 20:
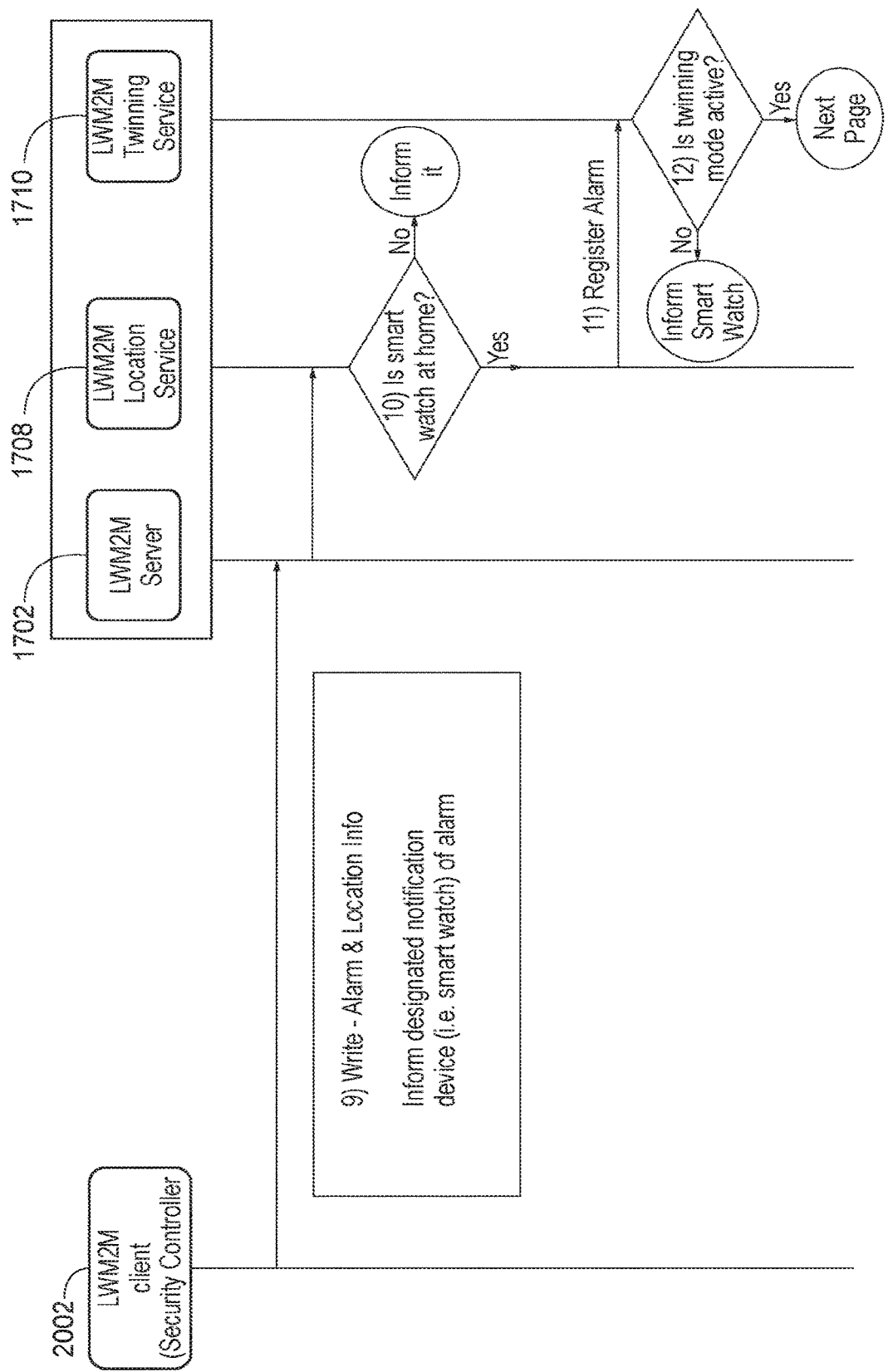
FIG. 20 illustrates a service trigger phase for twinning group service

FIG. 20 shows the service trigger phase of the twinning group service with the following steps:

In step 9 of FIG. 20, the security controller 2002, which is also a LWM2M client, senses a broken window (i.e. damaged accidently by a neighbor child's baseball) and sends a LWM2M Write to the LWM2M server 1702 requesting it to inform the appropriate device of an alarm.

In step 10 of FIG. 20, the LWM2M Location Service 1204 can then check if the smart watch is at home or not. If the smart watch is not at home then the twinning service 1204 is not triggered and the watch is informed directly.

In step 11 of FIG. 20, however, if the smart watch is at home then the twinning service 1204 is triggered about the alarm.

In step 12 of FIG. 20, the twinning mode activity is then checked to see if it is active or not:

If it is not active, then the primary device 802 (i.e. the watch) is informed directly of the alarm. (This step could also be enhanced with a conditional check (not shown) to also make sure that at least one or more of the TV's are ON, or else just inform the watch directly).

Figure 21:
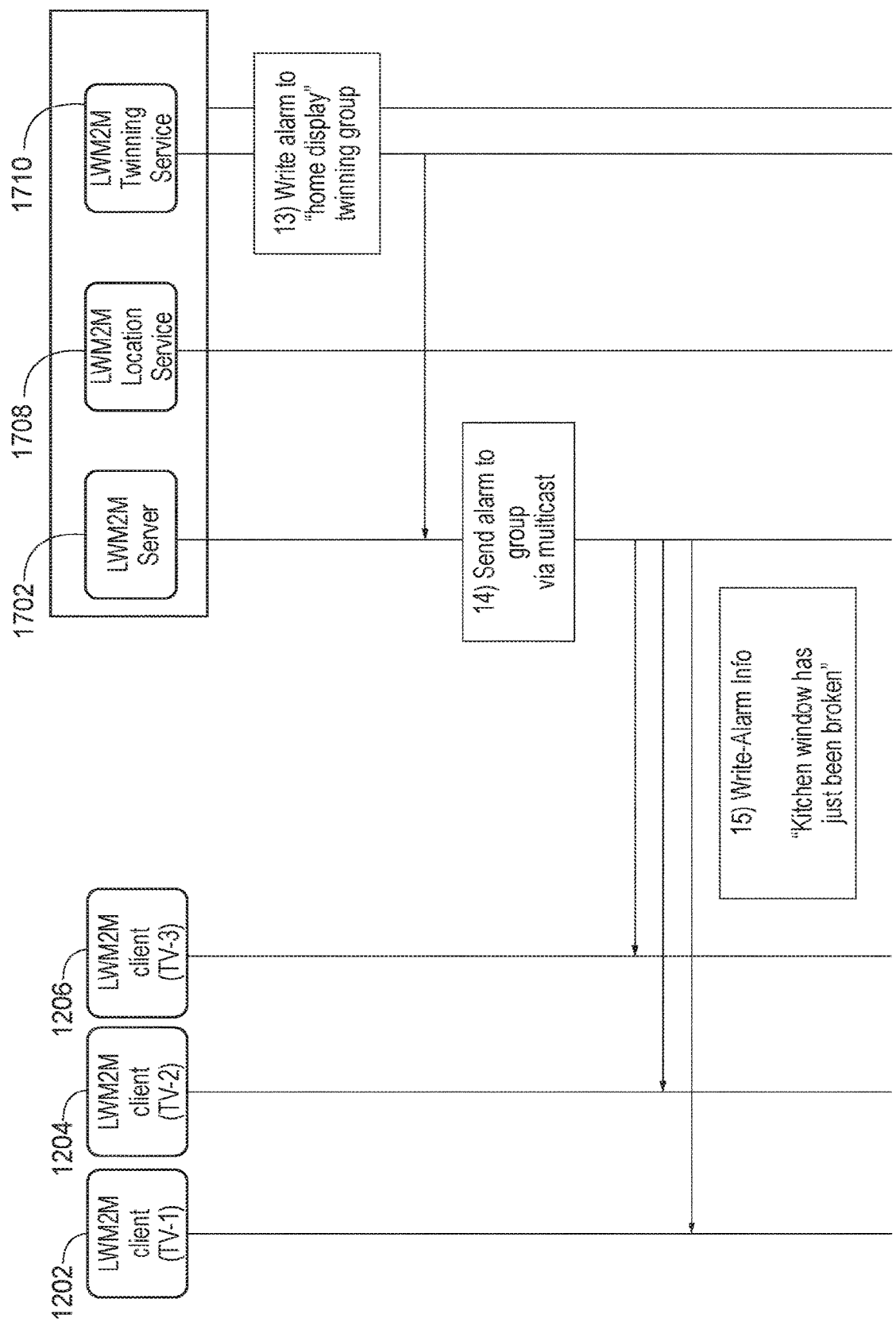
FIG. 21 illustrates a service delivery to twinning group.

If it is active, then see FIG. 21 for service delivery to the IoT twinning group.

FIG. 21 shows the service delivery to the IoT twinning group with the following steps:

In steps 13 and 14 of FIG. 21, the LWM2M server twinning service 1204, which was previously triggered, now sends a Write request to the "home display" twinning group to display the alarm message.

In step 15 of FIG. 21, the alarm is then transmitted to the individual TV's in the home display group by preferably an IP multicast message which can be the most efficient mechanism to transmit the alarm.

Figure 22:
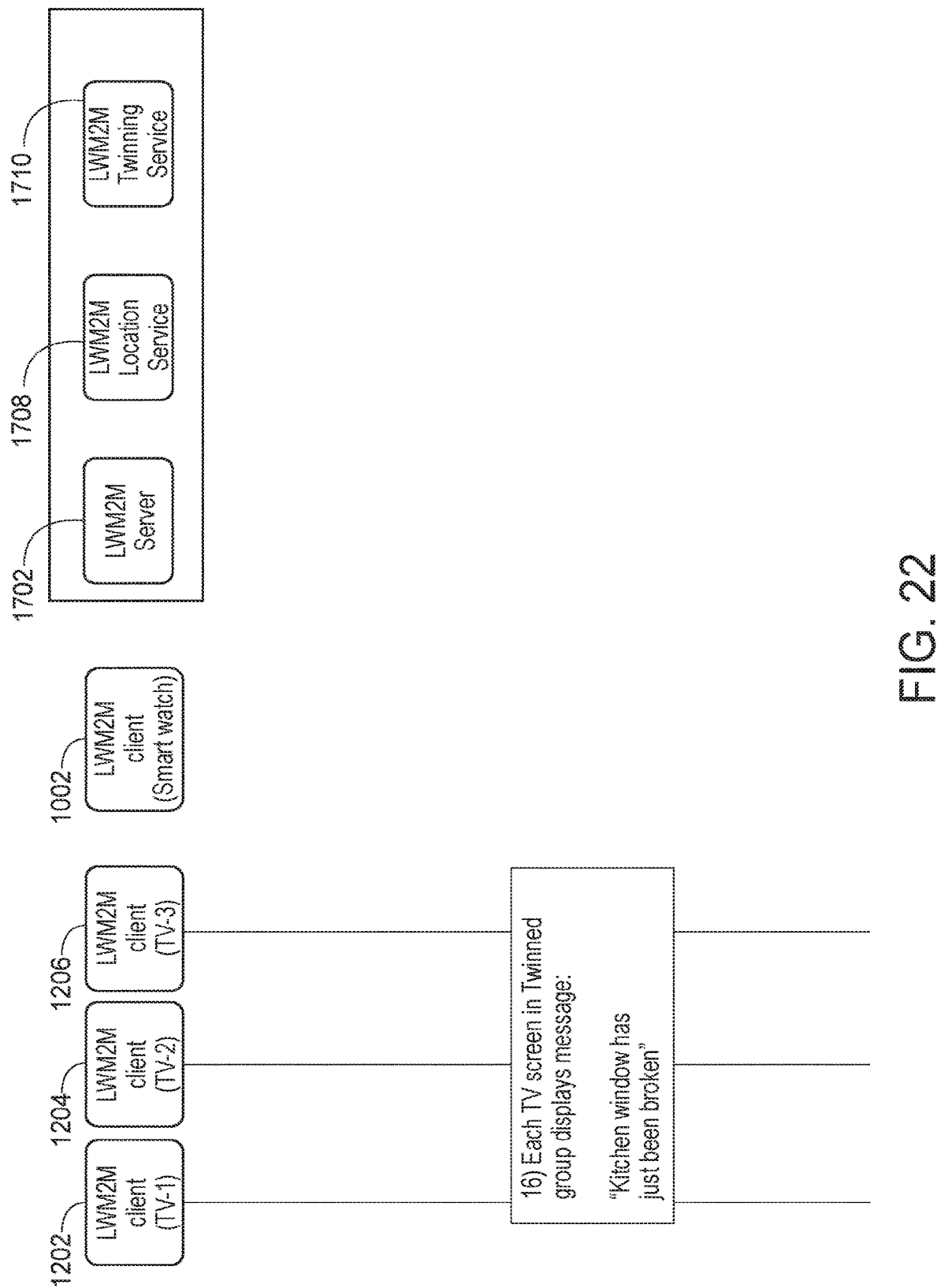
FIG. 22 illustrates a final display of message on group of twinned devices.

FIG. 22 shows the final display of messages on the twinned devices with the following steps:

In step 16 of FIG. 22, each of the three TVs in the twinning group (i.e. TV-1, TV-2, and TV-3) simultaneously display the alarm message. Note that the primary device 802 (i.e. smart watch) does not display anything as the service is configured for the alarm message to be displayed on the TV screens instead when the smart watch is at home.

If desired, the LWM2M Twinning service could also have been configured to also display the alarm message on the primary device 802 (i.e. smart watch) in addition to the TVs.

It is understood that the entities performing the steps illustrated in FIGS. 18-22 are logical entities that may be implemented in the form of software (i.e., computer-executable instructions) stored in a memory of, and executing on a processor of, a network node or computer system such as those illustrated in FIG. 27C or FIG. 27D. That is, the method(s) illustrated in FIGS. 18-22 be implemented in the form of software (i.e., computer-executable instructions) stored in a memory of a network node, such as the node or computer system illustrated in FIG. 27C or FIG. 27D, which computer executable instructions, when executed by a processor of the node, perform the steps illustrated in FIGS. 18-22. It is also understood that any transmitting and receiving steps illustrated in FIGS. 18-22 may be performed by communication circuitry of the node under control of the processor of the node and the computer-executable instructions (e.g., software) that it executes.

In addition to the procedures and signal flows described in the previous sections, several other key changes are required for OMA LWM2M and its underlying IETF CoAP family of standards to support twinning. Specifically:

1) CoRE Link Format needs changes to support a new "twinnable" resource type: New resource type (rt) has to be defined as follows:
   rt="twinnable"
   Example of usage:
      When LWM2M client registers it should indicate if the given resource is offered up to potentially join an IoT twinning group using this new resource type.
      This resource type also gives an indication that the LWM2M client is capable of joining an IP multicast group if it is assigned to join an IoT twinning group.

2) CoRE Link Format needs changes to support a new device level attribute to indicate that the device is either a "twinnable device" or not. This can be an alternate embodiment to using "rt=twinnable" (as shown above in (1)) which indicates status on a resource by resource basis.
   New device level device type (dt) can be defined as follows:
   dt="twinnable device", or dt="non twinnable device"
   (This is an alternative embodiment to the "rt=twinnable" approach shown above in (1)).

3) OMA LWM2M needs changes to its Access Control Object structure to allow correlation between a primary device 802 and its twinned secondary group of devices. Specifically, in LWM2M, a controlling LWM2M server 1702 sets the Access Control List (ACL) properties in LWM2M clients. Due to the addition of the twinning feature, the controlling LWM2M server 1702 needs to make sure that all the ACL properties it sets is consistent across a given set of a primary device 802 and its related twinned secondary group of devices. This shall be reflected in the controlling LWM2M server ACL data structures at the time of creation (or change in membership) of the dynamic twinning groups.

Figure 23:
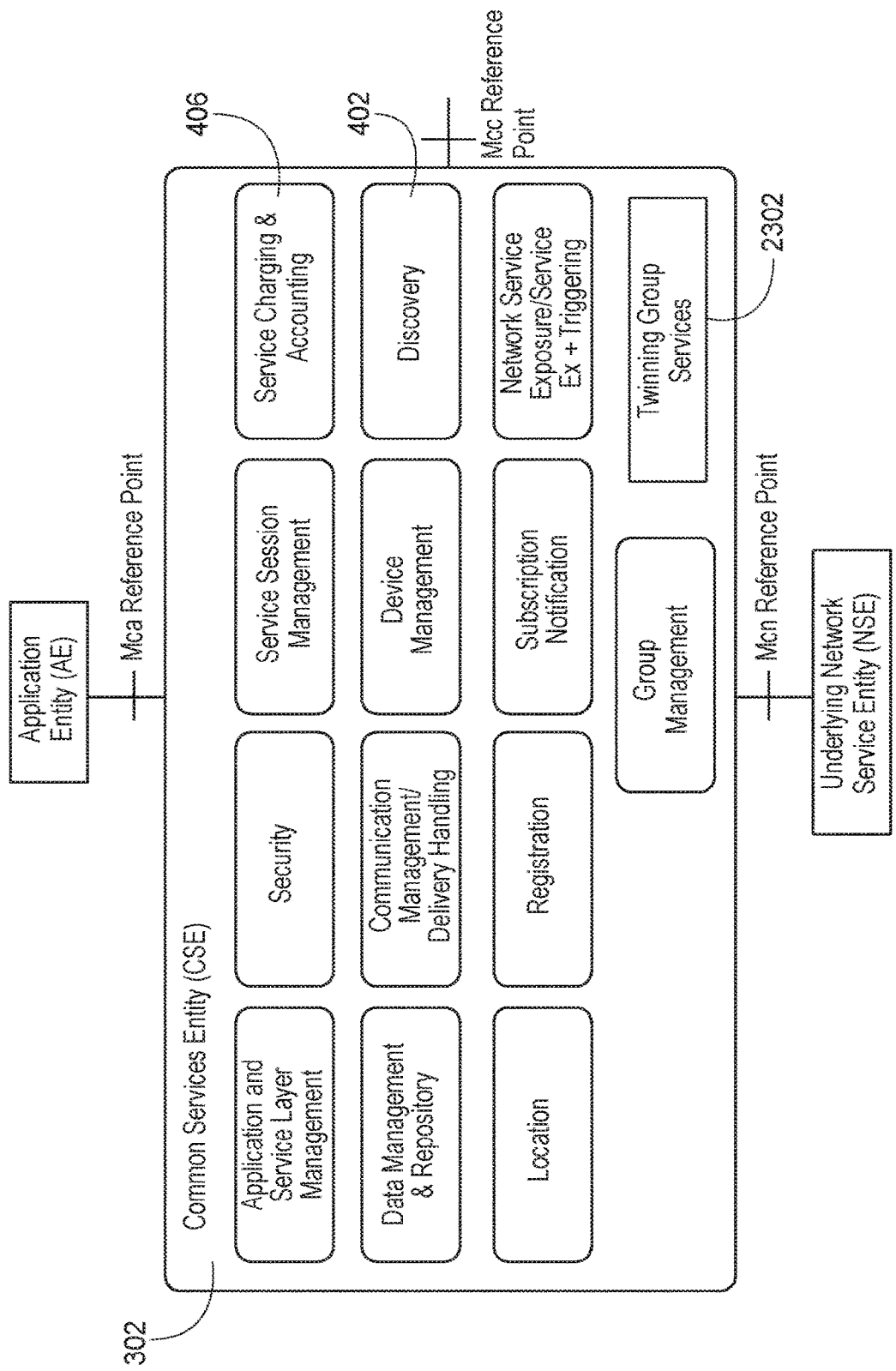
FIG. 23 illustrates a oneM2M CSF for twinning group services.

FIG. 23 shows the highlighted Twinning Group Services (TGS) CSF 2302 within the CSE reference model. Twinning Group Services 2302 is a new Common Services Function (CSF) within the oneM2M Common Services Entity (CSE) 302.

The Twinning Group Services (TGS) CSF 2302 enables Application Entity (AE) service delivery to be re-directed from a primary field domain node (i.e. single primary ASN) to a group of secondary field domain nodes (i.e. group of related secondary ASNs). The TGS CSF 2302 also enables AE services originating from one of the group of secondary field domain nodes to appear to an external network node as if the application service had originated instead from the primary field domain node.

An alternative approach would be to put the new TGS CSF defined in this disclosure as a new sub-function into the existing Group Management (GMG) CSF of the oneM2M standard. This is possible, but since the new TGS has a completely different approach then the GMG in forming groups, activating groups, etc., it is clearer to define the TGS as a new CSF. Also the new TGS has functions like re-directing traffic which the GMG does not support at all. However, this disclosure does not preclude the GMG CSF from supporting parts or all of the functionality described herein.

This section assumes that the primary and secondary field domain nodes are ASNs for simplicity. However, these nodes may also be Application Dedicated Nodes (ADNs) and the procedures, resources and attributes specified in this section would work equally well in this case.

Figure 25:
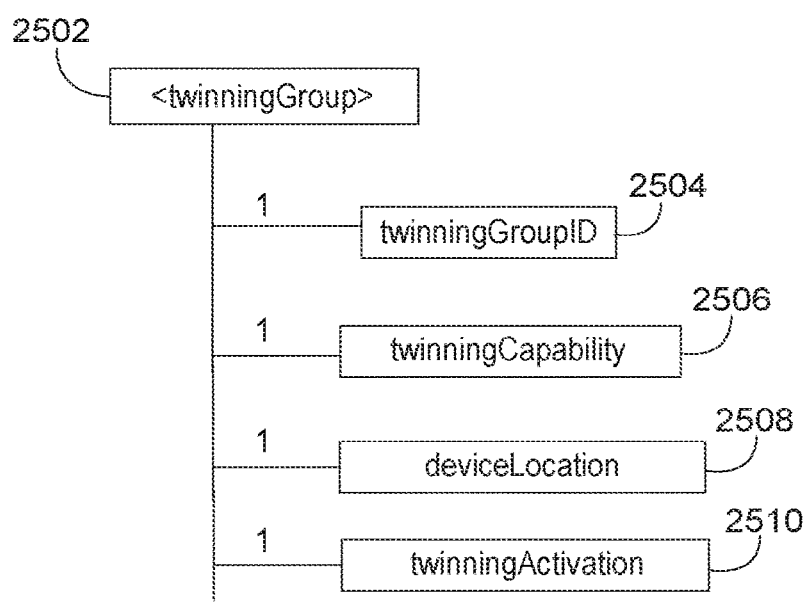
FIG. 25 illustrates a oneM2M "twinningGroup" resource type.

A new oneM2M resource type is defined in order to enable twinning group services. The new resource type is <twinningGroup> 2502 and it stores information for creation, activation and status of the twinning group as shown in FIG. 25

The <twinningGroup> resource type 2502 can contain the attributes specified in the table below request. After the resource is created on the IN/MN TGS CSF, it can then send back a twinningGroupId attribute assigned to the given group in the response.

A given twinning group can later be deleted by the primary node (ASN TGS CSF) sending a DELETE request with the twinningGroupId attribute to the given IN/MN (TGS CSF)

c. The next step, is for the individual secondary nodes (i.e. group of related secondary ASNs) to join the given group. This is accomplished by having each individual secondary ASN TGS CSF send an UPDATE request to the <twinningGroup> resource in the IN/MN TGS CSF. In this request the secondary ASN can include its own twinningCapability and deviceLocation attributes. The IN/MN TGS CSF can then send back a twinningGroupId attribute in the response assigning the secondary ASN to the correct matching group (i.e. by matching the attributes).

A given secondary node can later disassociate from a given group by sending an UPDATE request indicating the twinningGroupId, and null twinningCapability and deviceLocation attributes 2. Twinning Group Service Activation—
    a. After a twinning group is formed (in step 1 above), it can be activated by the primary node (i.e. single primary ASN TGS CSF) sending an UPDATE request to the <twinningGroup> resource in the IN/MN TGS CSF. The request can include twinningGroupId and twinningActivation attributes. Optionally, the primary node may also indicate its own current location via the deviceLocation attribute.

| Attributes of <twinningGroup> | Multiplicity | RW/RO/WO | Description |
| --- | --- | --- | --- |
| twinningGroupId 2504 | 0 . . . 1 | RW | This attribute contains the unique ID of the given twinning group |
| twinningCapability 2506 | 0 . . . 1 (L) | RW | This attribute contains a list of capabilities (e.g. camera monitoring, displaying video, sensing temperature, etc.) that: 1. the sending secondary device CSE supports 2. OR that the twinning group members should support (i.e. specified when the resource is created initially by the primary device CSE) |
| deviceLocation 2508 | 0 . . . 1 | RW | This attribute contains the location of the sending primary or secondary device CSE (e.g. GPS or indoor location coordinate) |
| twinningActivation 2510 | 0 . . . 1 | RW | This attribute allows the primary device CSE to activate (True) or disable (False) the twinning group |

Figure 26:
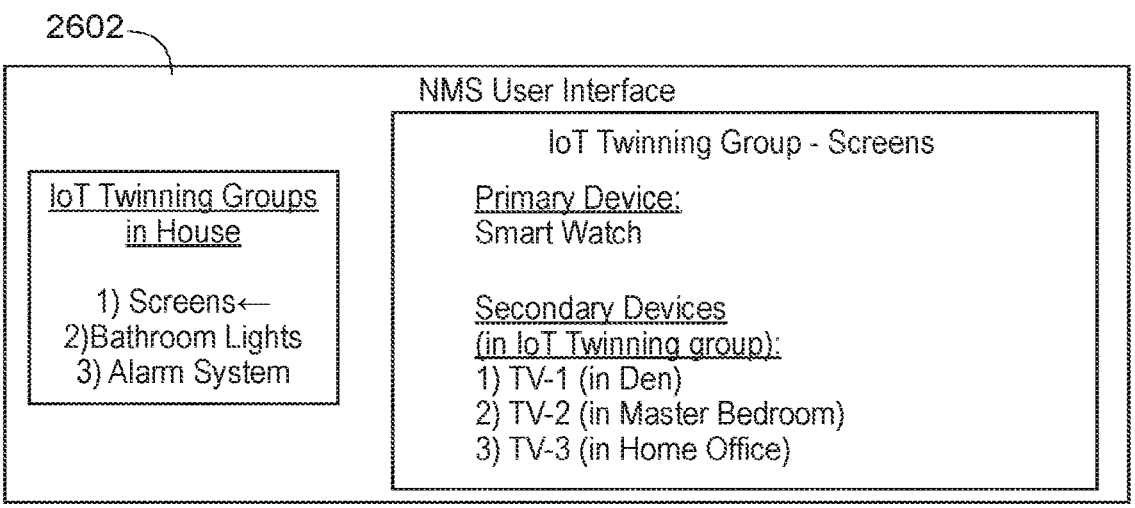
FIG. 26 illustrates an exemplary User Interface for IoT twinning group member identification

It may also be very useful to include the new twinningCapability attribute defined in FIG. 26

There are several distinct phases in the operation of the TGS CSF 2302 as follows:

1. Twinning Group Formation—
    a. It is assumed that the entities involved in twinning procedures described in this section first go through normal oneM2M procedures for discovery, registration, security, etc.
    b. A twinning group is initially formed when a primary node (i.e. single primary ASN TGS CSF) sends a CREATE request to the <twinningGroup> resource on an IN/MN TGS CSF. The type of group formed can be indicated by the twinningCapability and deviceLocation attributes sent in the CREATE Similarly, the twinning group can later be deactivated following the above but with the twinningActivation attribute set to indicate disabling of the group.

Both the activation/deactivation can also be done by an IN/MN-AE.

3. AE Service Delivery to Twinning Group—
    a. Once the group is formed and activated (in steps 1 and 2 above), the twinning group service is ready for use by any interested Application Entity (AE). Specifically, an AE that is interested in the service can send a RETRIEVE request to the <twinningGroup> resource in the IN/MN TGS CSF. The request can include the twinningCapability and optionally deviceLocation attributes that the AE is interested in.

Figure 24:
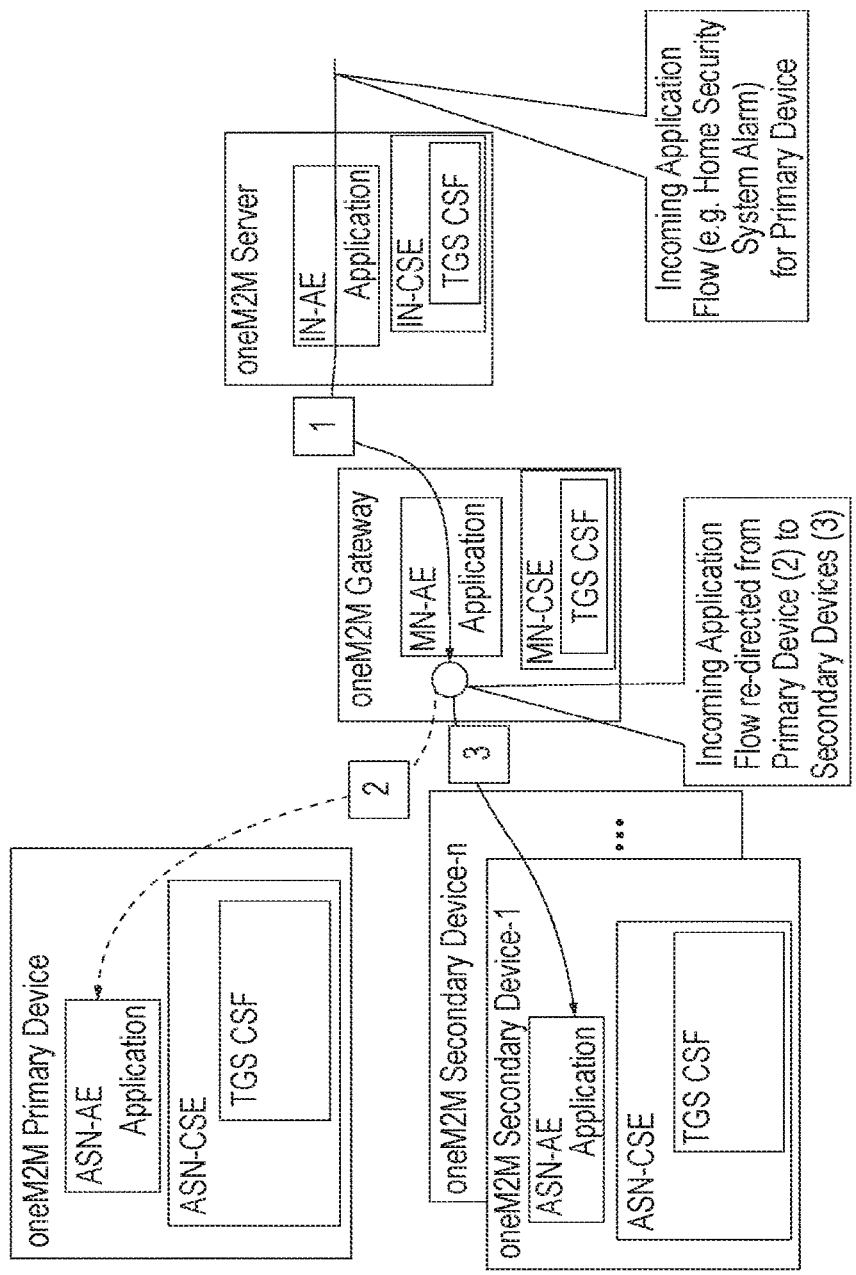
FIG. 24 illustrates an example of a service delivery to twinning group.

The response can contain the twinningGroupId and twinningActivation attributes of the correct matching group (i.e. by matching the attributes).
b. Using this information, the AE in the IN/MN can re-direct any incoming AE service flow away from the primary node and instead deliver it (fan it out) to each of the secondary nodes. This fan out can be accomplished using underlying Network Services Entity (NSE) capabilities such as IP multicast (i.e. correlate the twinningGroupId attribute to an IP multicast address). The overall service delivery process is shown in FIG. 24.

In the typical case a twinned service is re-directed only to the secondary nodes. However, it is also feasible that a twinned service could also be simultaneously mirrored onto the primary device 802 in addition to its being re-directed to the secondary devices.

A given secondary device may belong to multiple independent twinning groups:
  In this case, the secondary device would have been assigned multiple twinningGroupId attributes (i.e. one for each twinning group) when it joined in Step 1c above.
  It is then possible then that two or more twinned AE service flows may try to deliver messages to a given secondary device at the same time. In that case, a twinning service priority level for each twinning group should be used to ensure proper prioritization can be made at both the SL server and the secondary device. The twinning service priority level should be an attributed assigned by the network administrator. The twinning service priority level, for example, be assigned as a new attribute of the existing m2mServiceSubscriptionProfile resource defined in the oneM2M standard.

c) Service Origination from Twinning Group—Similarly, using the information from step (a) above, if the AE in the IN/MN receives a service message from a member of the twinning group (i.e. one of the related secondary ASNs) then the AE can check if it is destined for an external node (e.g. to an ASN that is not related to the twinning group at all). If so, then the AE in the IN or MN can forward the service message but change the identification of the originator of the service message to indicate the primary node (i.e. single primary ASN associated with the twinning group) instead of the secondary node that actually sent the service message.

This section describes the main procedures required for operations on the <twinningGroup> resource (located on the IN/MN TGS CSF). Namely:
  Twinning group formation:
    CREATE request (sent by primary node ASN TGS CSF)
    DELETE request (sent by primary node ASN TGS CSF)
    UPDATE request (sent by secondary node ASN TGS CSF)
  Twinning group service activation
    UPDATE request (sent by primary node ASN TGS CSF, or by an IN/MN AE)
  AE service delivery
    RETRIEVE request (sent by IN/MN AE)
  Create <twinningGroup>
  This procedure can be used for creating a <twinningGroup> resource.

| <twinningGroup> CREATE | |
| --- | --- |
| Associate Reference Point | Mcc, Mcc' |
| Information in Request message | From: Identifier of the primary node ASN-CSE (TGS CSF) that initiates the Request<br>To: The address of the IN-CSE or MN-CSE where the <twinning group> resource is intended to be created |
| Processing at Originator before sending Request | The Originator (primary node ASN TGS CSF) shall request to Create <twinningGroup> resource. The Originator can include twinningCapability and optionally deviceLocation attributes. These attributes are indicative of what should be supported by the twinning group to be created. (I.E. These attributes are not descriptive of the sending primary node itself but instead of the secondary nodes that can later join the <twinningGroup> resource). |
| Processing at the Receiver | For the CREATE procedure, the Receiver shall:<br>    Check if the Originator has CREATE permissions on the <twinningGroup> resource<br>    Validate if the twinningCapability and optionally deviceLocation attributes are included in the request<br>    Internally, set the twinningActivation status to be disabled (i.e. indicating that the group is created but not yet active) |
| Information in Response message | The twinningGroupId attribute associated with the created <twinningGroup> resource |
| Processing at Originator after receiving Response | N/A |
| Exceptions | N/A |

Delete <twinningGroup>
This procedure can be used for deleting an existing <twinningGroup> resource.

| <twinningGroup> DELETE | |
|---|---|
| Associate Reference Point | Mcc, Mcc' |
| Information in Request message | From: Identifier of the primary node ASN-CSE (TGS CSF) that initiates the Request<br>To: The address of the IN-CSE or MN-CSE where the <twinning group> resource was previously created |
| Processing at Originator before sending Request | The Originator (primary node ASN TGS CSF) shall request to delete an existing <twinningGroup> resource associated with the given twinningGroupId attribute which can be attached to the request. |
| Processing at the Receiver | For the DELETE procedure, the Receiver shall:<br>    Check if the Originator has DELETE permissions on the <twinningGroup> resource |
| Information in Response message | N/A |
| Processing at Originator after receiving Response | N/A |
| Exceptions | N/A |

Update <twinningGroup>
This procedure can be used for updating an existing <twinningGroup> resource.

| <twinningGroup> UPDATE | |
|---|---|
| Associate Reference Point | Mcc, Mcc', Mca, Mca' |
| Information in Request message | From: Identifier of the primary or secondary node ASN-CSE (TGS CSF), or IN/MN-AE that initiates the Request<br>To: The address of the IN-CSE or MN-CSE where the <twinning group> resource has been previously created |
| Processing at Originator before sending Request | There are three distinct cases:<br>1. If the Originator is the primary node ASN TGS CSF or an IN/MN-AE, then it is sending the Update request because it wants to set the twinningActivation attribute. Therefore, it can attach the twinningActivation attribute, and optionally the deviceLocation attribute, to the request. It can also attach the twinningGroupId for the group in question to the request.<br>2. If the Originator is a secondary node ASN TGS CSF sending the Update request because it wants to join a group. Then, it can attach the twinningCapability attribute, and optionally the deviceLocation attribute, to the request.<br>3. If the Originator is a secondary node ASN TGS CSF sending the Update request because it wants to disassociate from a group that it had previously joined. Then, it can attach the twinningGroupId attribute, and null twinningCapability and deviceLocation attributes, to the request. |
| Processing at the Receiver | For the UPDATE procedure, the Receiver shall handle the three potential request cases (see above) as follows:<br>1. Set the internal twinningActivation status to the value in the twinningActivation attribute sent in the request (i.e. indicating that the group is either active or disabled). If the deviceLocation attribute was included in the request, then any required checks based on the primary node current location may also be done before setting the internal twinningActivation status.<br>2. Find an existing group that matches with the twinningCapability attribute, and optionally the deviceLocation attribute, sent in the request. Then internally associate the sending secondary node to the selected group.<br>3. Disassociate the sending secondary node from the given group (i.e. identified by the twinningGroupId attribute that was sent) |

-continued

| | <twinningGroup> UPDATE |
|---|---|
| Information in Response message | The information sent back in the Response depends on which request case (see above) as follows:<br>    1. Indication of successful processing<br>    2. The twinningGroupId attribute of the group that the secondary node was successfully joined to<br>    3. Indication of successful processing |
| Processing at Originator after receiving Response | N/A |
| Exceptions | N/A |

Retrieve <twinningGroup>

This procedure can be used for retrieving the content of an existing <twinningGroup> resource.

| | <twinningGroup> RETRIEVE |
|---|---|
| Associate Reference Point | Mca, Mca' |
| Information in Request message | From: Identifier of the AE that initiates the Request<br>To: The address of the IN-CSE or MN-CSE where the <twinning group> resource was previously created |
| Processing at Originator before sending Request | The Originator (AE) shall attach the twinningCapability and optionally deviceLocation attributes that it is interested in |
| Processing at the Receiver | For the RETIEVE procedure, the Receiver shall:<br>    Find the group (i.e. twinningGroupId attribute) that has matching twinningCapability and optionally deviceLocation attributes. |
| Information in Response message | The twinningGroupId attribute and its associated twinningActivation (which indicates if the group is currently activated or not) attributes |
| Processing at Originator after receiving Response | N/A |
| Exceptions | N/A |

Security for AE Service Flow

The access control policies of IN/MN nodes need to be updated to allow correlation between a primary device 802 and its twinned secondary group of devices for AE service flows. That is, due to the addition of the twinning feature, the IN/MN nodes must now make sure that all the Access Control List (ACL) properties are set consistently across a given set of a primary device 802 and its related twinned secondary group of devices as AE service flows may be switched between the primary and secondary devices (e.g. see FIG. 24). This may be accomplished, for example, by setting dynamic ACL data structures at the time of creation (or change in membership) of the twinning groups.

Interfaces, such as Graphical User Interfaces (GUIs), can be used to assist user to control and/or configure functionalities related to Twinning Services. FIG. 26 is a diagram that illustrates an interface 2602. The user interface 2602 is a listing of the current secondary devices associated with a given IoT twinning group, and also its associated primary device 802. The information can be displayed in the user interface associated with the given SL server 1202 handling the IoT twinning group service logic. The user interface 2602 can also be used to adjust or create a twinning group. The information in FIG. 26 is displayed as a text list, however it may also be illustrated pictorially using icons, pictures, etc. It is to be understood that interface 2602 can be produced using displays such as those shown in FIGS. 27C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 27A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602.

As shown in FIG. 27A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 27A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 27B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602. The M2M service layer 22 may be implemented by one or more servers, computers, devices, virtual machines (e.g. cloud/storage farms, etc.) or the like, including for example the devices illustrated in FIGS. 27C and 27D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 27B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602 may be hosted within a M2M service layer instance hosted by an M2M node, such as an M2M server, M2M gateway, or M2M device, as shown in FIG. 27B. For example, the logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 27C or FIG. 27D described below.

Further, logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602 can implemented as part of an M2M network that uses a Service Oriented Architecture (SOA) and/or a Resource-Oriented Architecture (ROA) to access services of the present application.

FIG. 27C is a block diagram of an example hardware/software architecture of a M2M network node 30, such as an M2M device 18, an M2M gateway 14, an M2M server, or the like. The node 30 can execute or include logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602. The device 30 can be part of an M2M network as shown in FIG. 27A-B or part of a non-M2M network. As shown in FIG. 27C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 27C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 27C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 27C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 27D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/ TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 27A and FIG. 27B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 27 A-B or the device 30 of FIG. 27 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as twinning service 1204; location service 1206; primary device 802; twinned device 804; sending device 806; service layer 102 and 808; external device 902; applications 106; IP networking stack 104; CSE 302, 306; AE 304; NSE 310; CSFs; DM server 502; DM interface 510; DM tree 508; MO 506; Device 504 608; LWM2M Server 602, 1702; LWM2M client 604; LWM2M objects 606; CoAP 702; smart watch 1002; LWM2M Client/TV 1104, 1110, 1112, 1114; service layer server 1202; secondary device 1208, 1210, 1212; WiFi 1706; Security controller 2002; Twinning Group Services CSF 2302; and logical entities to produce interfaces such as interface 2602 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to implement a service layer and perform operations comprising:
   detecting, via the service layer, information associated with a plurality of secondary devices, wherein the information indicates at least one of a sleep schedule of each secondary device of the plurality of secondary devices or location information of each secondary device of the plurality of secondary devices;
   determining, via the service layer and based on the information, whether each secondary device of the plurality of secondary devices is capable of operating in a twinning group associated with a primary device;
   automatically assigning, via the service layer and based on the information and the determining that each secondary device of the plurality of secondary devices is capable of operating in the twinning group, each secondary device, of the plurality of secondary devices that is capable of operating in the twinning group, to the twinning group; and
   causing, via the service layer, registration of each secondary device, of the plurality of secondary devices that is assigned to the twinning group, as a member of the twinning group to cause redirecting, to at least one secondary device assigned to the twinning group, a message directed to the primary device.

2. The apparatus of claim 1, wherein the message is redirected to an Internet Protocol (IP) address of the at least one secondary device assigned to the twinning group.

3. The apparatus of claim 2, wherein the IP address is an IP multicast address and the redirecting comprises sending the message to the IP multicast address.

4. The apparatus of claim 1, wherein the plurality of secondary devices comprise Internet of Things (IoT) devices.

5. The apparatus of claim 1, wherein the twinning group comprises a plurality of Internet of Things (IoT) devices.

6. The apparatus of claim 1, wherein the automatically assigning is further based on server logic.

7. The apparatus of claim 1, wherein the automatically assigning is further based on an input from a user via the primary device.

8. The apparatus of claim 1, wherein the information further comprises at least one of:
   a type of device associated with each secondary device of the plurality of secondary devices,
   a function associated with each secondary device of the plurality of secondary devices,
   a device identifier associated with each secondary device of the plurality of secondary devices,
   a service layer identifier associated with each secondary device of the plurality of secondary devices,
   an application identifier associated with each secondary device of the plurality of secondary devices,
   a device hardware identifier associated with each secondary device of the plurality of secondary devices,
   a network password associated with each secondary device of the plurality of secondary devices, and
   a manufacturer identifier associated with each secondary device of the plurality of secondary devices.

9. The apparatus of claim 1, wherein determining whether each secondary device of the plurality of secondary devices is capable of operating in the twinning group comprises determining whether each secondary device of the plurality of secondary devices is capable of a function.

10. The apparatus of claim 1, wherein determining whether each secondary device of the plurality of secondary devices is capable of operating in the twinning group comprises determining a transmission bitrate of each secondary device of the plurality of secondary devices.

11. The apparatus of claim 1, wherein determining whether each secondary device of the plurality of secondary devices is capable of operating in the twinning group comprises determining whether each secondary device of the plurality of secondary devices is compatible with other secondary devices in the twinning group.

12. The apparatus of claim 1, wherein the redirecting comprises sending a multicast message to the at least one secondary device assigned to the twinning group.

13. The apparatus of claim 1, wherein the redirecting comprises sending a unicast message to the at least one secondary device assigned to the twinning group.

14. A method for use in an apparatus implementing a service layer, the method comprising:
- detecting, via the service layer, information associated with a plurality of secondary devices, wherein the information indicates at least one of a sleep schedule of each secondary device of the secondary devices or location information of each secondary device of the secondary devices;
- determining, via the service layer and based on the information, whether each secondary device of the plurality of secondary devices is capable of operating in a twinning group associated with a primary device;
- automatically assigning, via the service layer and based on the information and determining that each secondary device of the plurality of secondary devices is capable of operating in the twinning group, each secondary device, of the plurality of secondary devices that is capable of operating in the twinning group, to the twinning group; and
- causing, via the service layer, registration of each secondary device, of the plurality of secondary devices that is assigned to the twinning group, as a member of the twinning group to cause redirecting, to at least one secondary device assigned to the twinning group, a message directed to the primary device.

15. The method of claim 14, wherein the message is redirected to an Internet Protocol (IP) address of the at least one secondary device assigned to the twinning group.

16. The method of claim 15, wherein the IP address is an IP multicast address and the redirecting comprises sending the message to the IP multicast address.

17. The method of claim 14, wherein the plurality of secondary devices comprise Internet of Things (IoT) devices.

18. The method of claim 14, wherein the automatically assigning is further based on server logic.

* * * * *